United States Patent
Fujimoto

(10) Patent No.: US 8,385,022 B2
(45) Date of Patent: Feb. 26, 2013

(54) SUSPENSION FOR SUPPORTING A MAGNETIC HEAD SLIDER

(75) Inventor: Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 0 days.

(21) Appl. No.: 13/159,125

(22) Filed: Jun. 13, 2011

(65) Prior Publication Data

US 2012/0218666 A1 Aug. 30, 2012

(30) Foreign Application Priority Data

Jun. 15, 2010 (JP) ................................ 2010-135814

(51) Int. Cl.
*G11B 5/48* (2006.01)
(52) U.S. Cl. .................... 360/244.2; 360/244.9
(58) Field of Classification Search ............... 360/244.2, 360/244.3, 244.9
See application file for complete search history.

(56) References Cited

U.S. PATENT DOCUMENTS

| | | | | | |
|---|---|---|---|---|---|
| 4,797,763 | A | * | 1/1989 | Levy et al. ................ | 360/245.6 |
| 5,731,931 | A | * | 3/1998 | Goss ......................... | 360/244.9 |
| 6,392,843 | B1 | * | 5/2002 | Murphy ..................... | 360/245.3 |
| 6,731,465 | B2 | * | 5/2004 | Crane et al. ............... | 360/244.3 |
| 7,133,259 | B2 | * | 11/2006 | Takagi et al. ............. | 360/244.3 |
| 7,333,299 | B2 | * | 2/2008 | Wada et al. ............... | 360/294.7 |
| 7,375,927 | B1 | * | 5/2008 | Miller ....................... | 360/244.3 |
| 8,159,785 | B1 | * | 4/2012 | Lee et al. .................. | 360/244.2 |
| 2006/0227463 | A1 | * | 10/2006 | Wright et al. ............. | 360/244.2 |
| 2010/0202087 | A1 | * | 8/2010 | Fujimoto et al. .......... | 360/244.2 |
| 2010/0208389 | A1 | * | 8/2010 | Ikeji ......................... | 360/244.2 |
| 2010/0277834 | A1 | * | 11/2010 | Nojima ..................... | 360/244.2 |
| 2012/0087043 | A1 | * | 4/2012 | Fujimoto .................. | 360/244.2 |

FOREIGN PATENT DOCUMENTS

| JP | 2005-032393 | 2/2005 |
|---|---|---|
| JP | 2008-021374 | 1/2008 |

* cited by examiner

*Primary Examiner* — Brian Miller
(74) *Attorney, Agent, or Firm* — Sterne, Kessler, Goldstein & Fox P.L.L.C.

(57) ABSTRACT

A load beam part main body portion's side edges include a proximal end region inclined at a first angle and a distal end region inclined at a smaller second angle. Where "L" is a distance in a suspension longitudinal direction between a supporting part's distal end portion and a dimple, a distance "a" in the same direction from the supporting part's distal end portion until an inflection point between the proximal end region and the distal end region satisfies 0.44L≦a≦0.78L. A support plate's side edges fixed to the load beam part main body portion's lower surface is located, in the suspension width direction, inward from a virtual line connecting the proximal end region's proximal end and the distal end region's distal end and outward from the proximal end region and the distal end region, and extends, in the suspension longitudinal direction, across the inflection point.

10 Claims, 19 Drawing Sheets

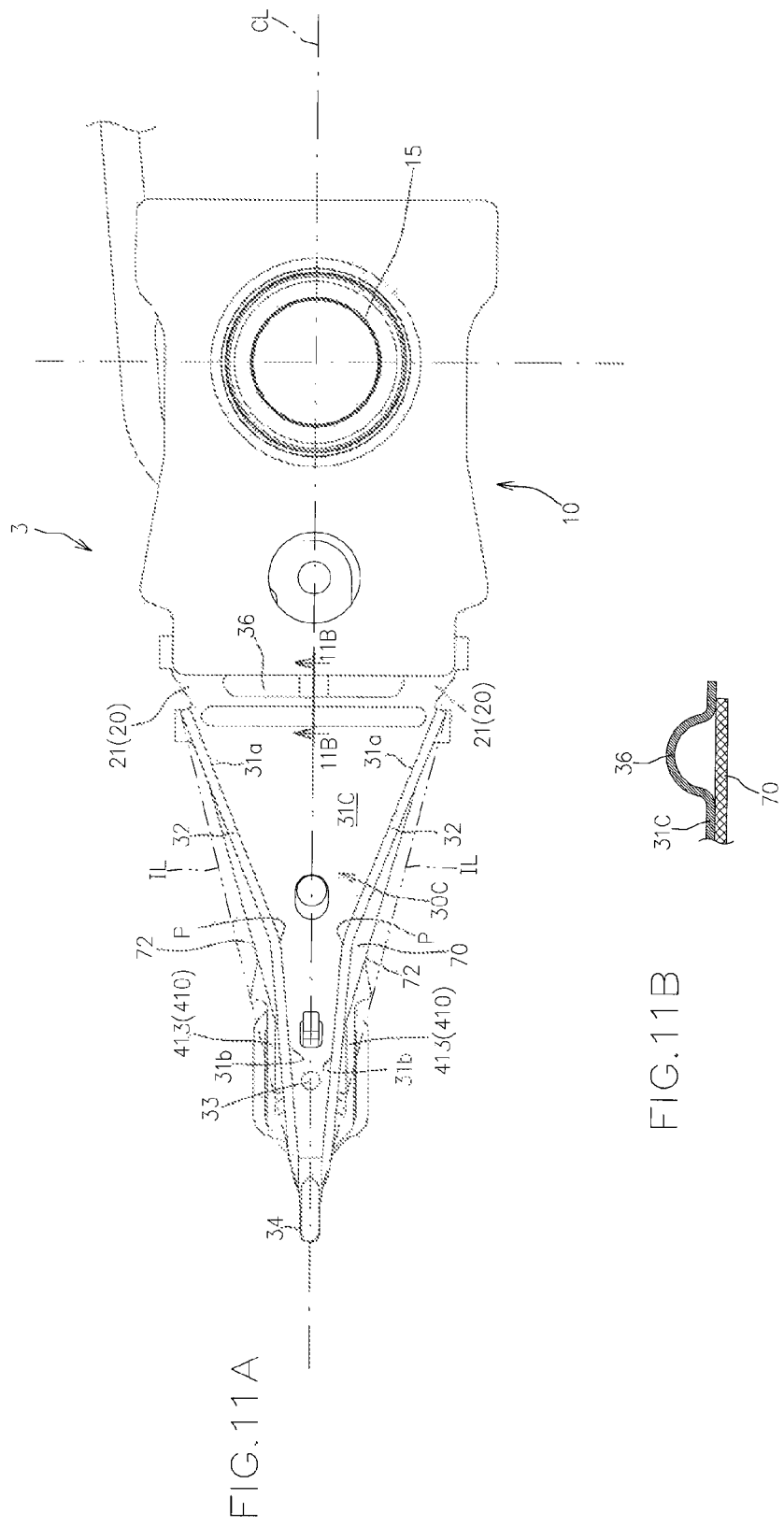

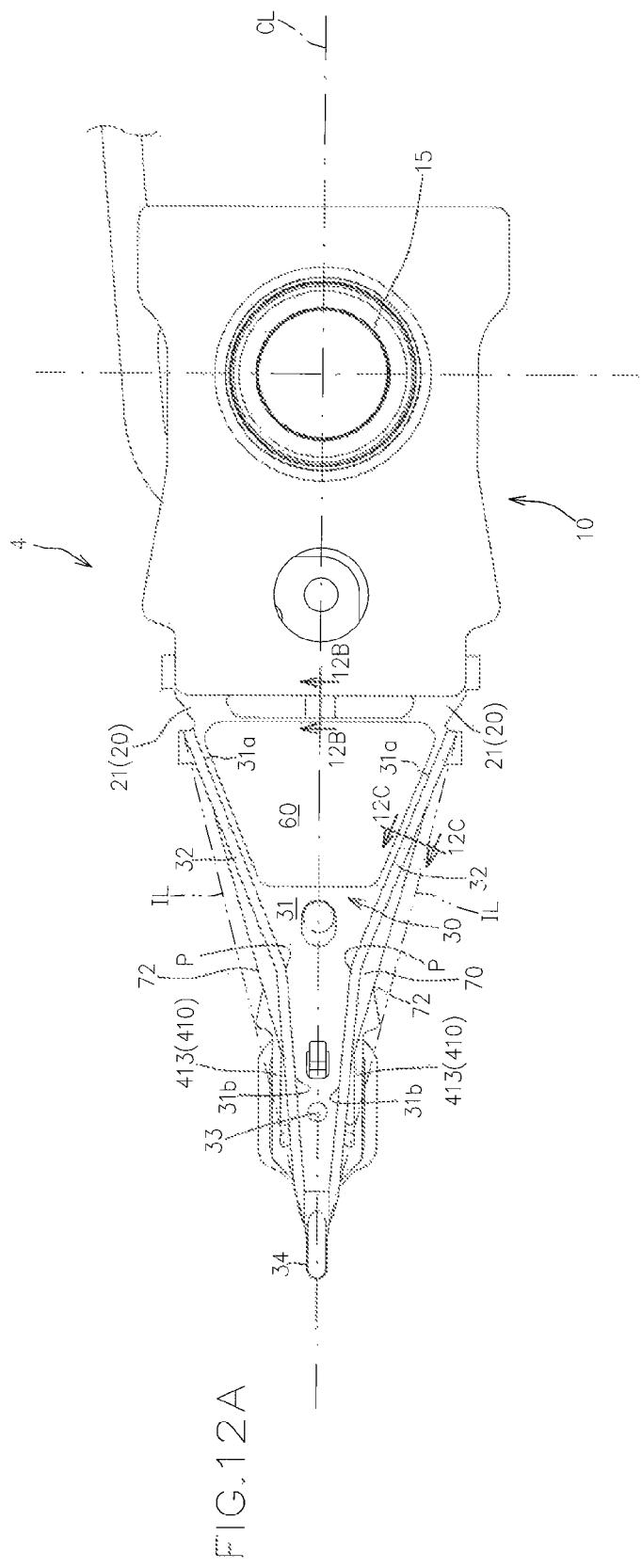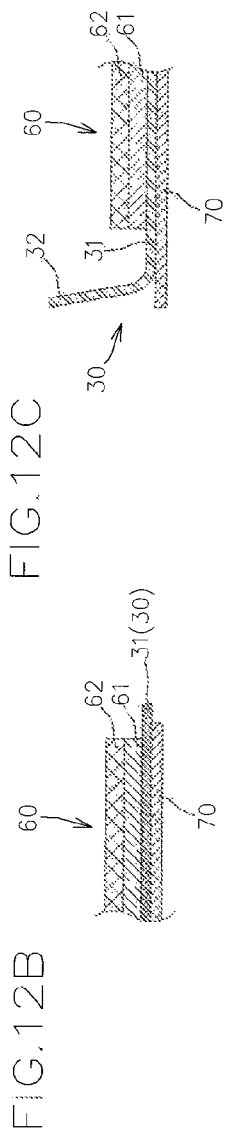

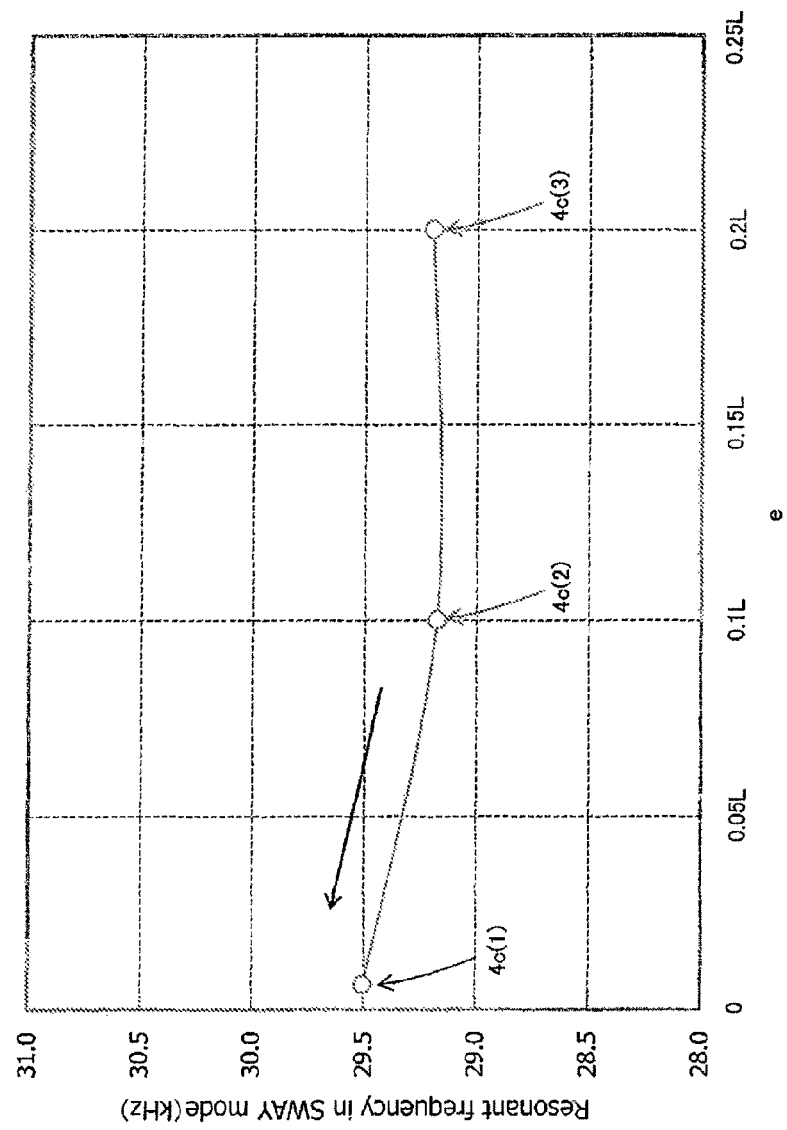

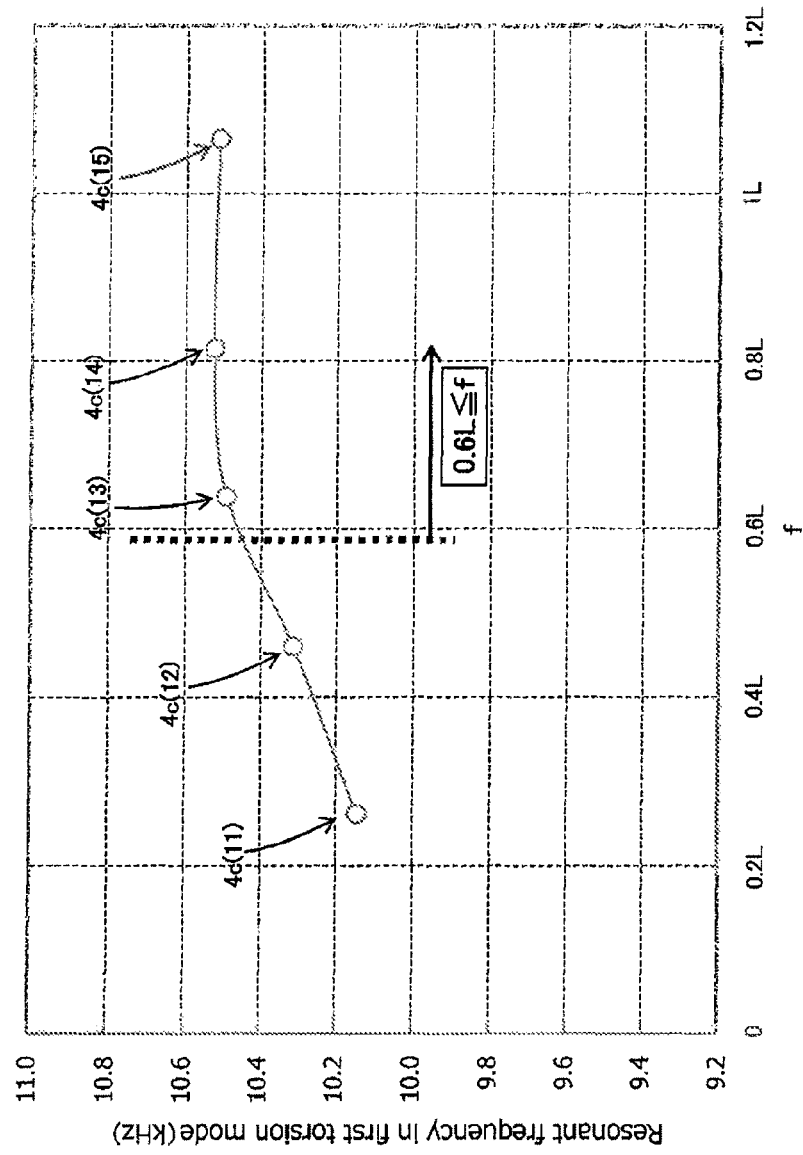

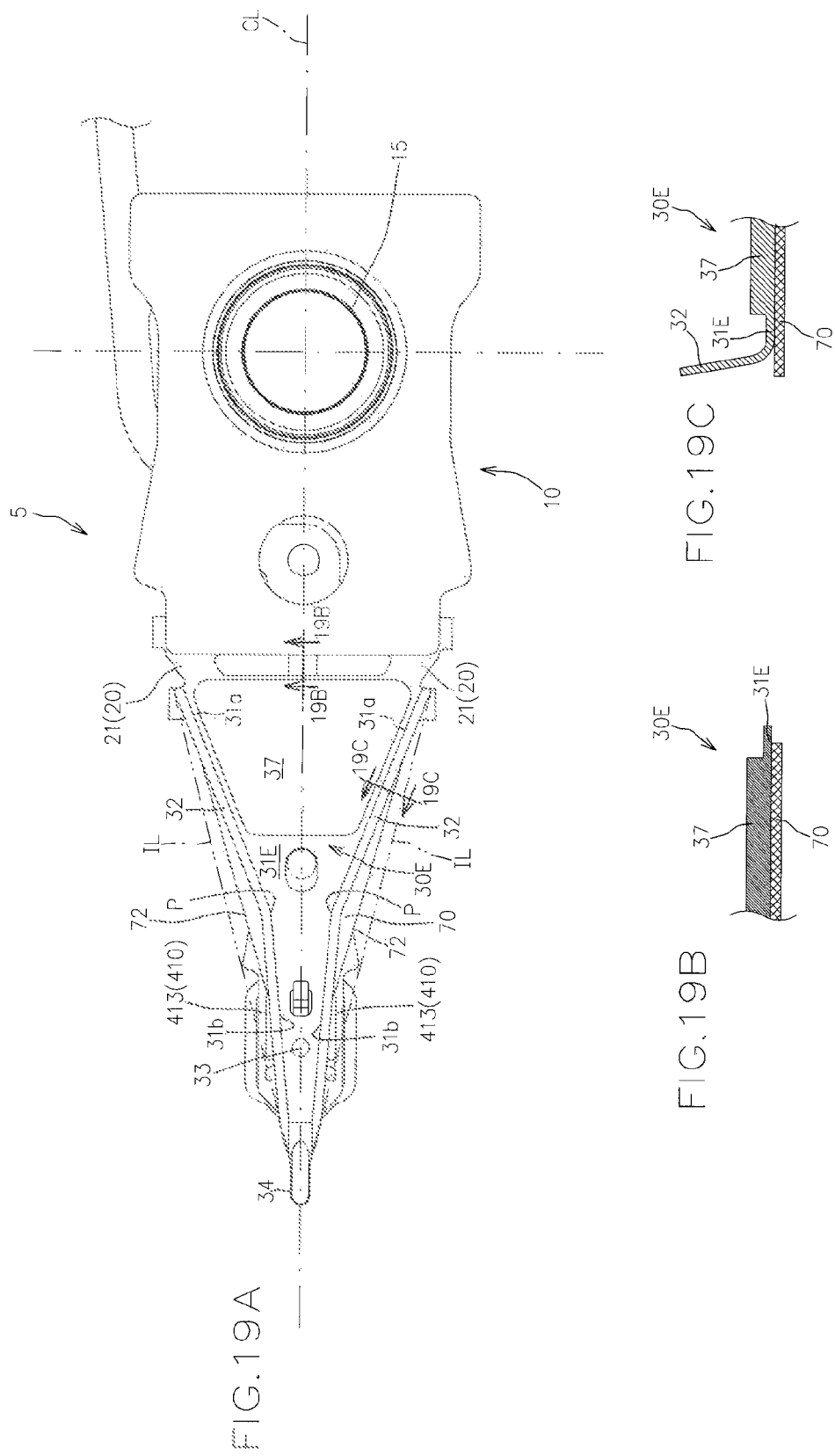

SUSPENSION FOR SUPPORTING A MAGNETIC HEAD SLIDER

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Due to the increase in capacity of a magnetic disk device, a magnetic head suspension is required to prevent, as much as possible, displacement of a magnetic head slider from a target track even in a case where the magnetic head suspension is swung about a swing center at a higher speed so that the magnetic head slider is quickly shifted onto the target track.

For example, Japanese Unexamined Patent Publication No. 2005-032393 (hereinafter, referred to as Prior Art Document 1) discloses a magnetic head suspension including a load beam part that has a main body portion in a flat plate shape and paired right and left ribs (flange portions) extending respectively from side edges of the main body portion so as to be apart from a disk surface. In this magnetic head suspension, the respective side edges of the main body portion are inclined toward a suspension longitudinal center line such that the load beam part is gradually reduced in width as it advances from a proximal end to a distal end in the suspension longitudinal direction. Further, each of the ribs is at least partially curved to form a narrowed portion in a planar view along a direction perpendicular to the disk surface.

The magnetic head suspension disclosed in Prior Art Document 1 is regarded such that the provision of the narrowed portions reduces the weight of the load beam part, thereby allowing the resonant frequency of the load beam part to be higher than the conventional configurations.

As described above, Prior Art Document 1 discloses the feature that the resonant frequency can be raised by the narrowed portions provided to the flange portions of the load beam part. However, it is unknown in Prior Art Document 1 which one of various vibration modes is focused on with regard to the resonant frequency possibly generated to a magnetic head suspension.

Japanese Unexamined Patent Publication No. 2008-021374 (hereinafter, referred to as Prior Art Document 2) discloses a magnetic head suspension including an elastic deformation portion and a main body portion that extends forward from the elastic deformation portion. The main body portion includes a first member and a second member. The first member is gradually reduced in width as it advances to a front end and is provided with flanges at right and left side edges thereof. The second member is substantially in a T-letter shape, and has a wide portion provided at a proximal edge with a flange and a narrow portion extending forward from the wide portion. The narrow portion has a width smaller than that of the main body portion, and is provided at right and left side edges with flanges.

In Prior Art Document 2, the first and second members are joined with each other to form an assembly, which integrally configures a load bending part and a load beam part.

In other words, the elastic deformation portion configures the load bending part, and the main body portion and the second member configure the load beam part.

More specifically, the side edges of the main body portion are provided with the flanges and are inclined so as to be gradually come closer to the suspension longitudinal center line as they advance to the respective front ends. The side edges of the narrow portion are provided with the flanges and extend substantially in parallel with the suspension longitudinal center line at positions closer to the center line than the side edges of the main body portion.

Accordingly, the load beam part configured by the main body portion and the second member has the right and left side edges that are provided with the flanges substantially in the entire areas in the suspension longitudinal direction. The side edges have proximal end regions that are respectively inclined at a first inclination angle with respect to the center line so as to be gradually closer to the center line as they advance to the respective front ends, and distal end regions that extend substantially in parallel with the center line.

In the magnetic head suspension disclosed in Prior Art Document 2, the distal end region of the load beam part is configured by the narrow portion, thereby successfully reducing the width of the load beam part as compared to the conventional cases. This will lead to the reduction of the moment of inertia of the load beam part about a twist center line (or torsion center line) along the center line so as to raise the resonant frequency in a first torsion mode.

The vibrations of the torsion mode that generate in a magnetic head suspension include, in addition to the first torsion mode, a second torsion mode and a third torsion mode.

Nevertheless, Prior Art Document 2 refers only to the vibration in the first torsion mode, and fails to take into consideration the vibration in the second torsion mode and the vibration in the third torsion mode.

More specifically, in a case where the frequency of a drive signal of the actuator is raised in order to shift more quickly the magnetic head slider onto a target track, a resonant vibration in the first torsion mode is generated to the magnetic head suspension when the frequency of the drive signal reaches a certain frequency (hereinafter, referred to as a first resonant frequency).

In a case where the frequency of the drive signal is further raised beyond the first resonant frequency, upon reaching another certain frequency (hereinafter, referred to as a second resonant frequency), a resonant vibration in the second torsion mode is generated to the magnetic head suspension. In a case where the frequency of the drive signal is furthermore raised beyond the second resonant frequency, upon reaching still another certain frequency (hereinafter, referred to as a third resonant frequency), a resonant vibration in the third torsion mode is generated to the magnetic head suspension.

In the resonant vibration in the first torsion mode, in a state where a position at which the load bending part and a position at which the dimple of the load beam part are arranged so as not to be displaced in a z direction perpendicular to the disk surface (namely, the positions form nodes), only the load beam part is principally twisted about the twist center line along the suspension longitudinal center line so that a substantially center portion between the two nodes in the suspension longitudinal direction is displaced to the maximum in the z direction (namely, the substantially center portion forms an antinode).

In the resonant vibration in the second torsion mode, in a state where three positions form the nodes, the three positions including a position at which the supporting part is rigidly fixed with respect to the z direction (in a case where the supporting part is configured by a base plate, a position of a boss portion that is fixed by caulking to a carriage arm coupled to an actuator; hereinafter, referred to as a supporting part fixed position), a position at which the dimple is arranged, and a halfway position of the load beam part that is located at a substantially center in the suspension longitudinal direction between the supporting part fixed position and the position of the dimple, the distal end region of the supporting part, the load bending part and the load beam part are twisted about the twist center line along the suspension longitudinal center line so that two portions form the antinode, the two portions including a substantially center portion between the supporting part fixed position and the halfway position of the load beam part in the suspension longitudinal direction and a substantially center portion between the halfway position of the load beam part and the position of the dimple in the suspension longitudinal direction.

In the resonant vibration in the third torsion mode, in a state where four positions form the nodes, the four positions including the supporting part fixed position, the position of the load bending part, the position of the dimple and the halfway position of the load beam part that is located at a substantially center in the suspension longitudinal direction between the position of the load bending part and the position of the dimple, a first portion located between the supporting part fixed position and the position of the load bending part is twisted in a first direction about the twist center line along the suspension longitudinal center line, a second portion located between the position of the load bending part and the halfway position of the load beam part is twisted about the twist center line in a second direction, which is reverse to the first direction, and a third portion located between the halfway position of the load beam part and the position of the dimple is twisted about the twist center line in the first direction.

Therefore, in order to maintain the favorable positioning accuracy of the magnetic head slider onto the target track, as well as in order to increase the swing speed of the magnetic head suspension about the swing center by the actuator thereby to reduce as much as possible the time required to shift the magnetic head slider onto the target track, not only the resonant frequency in the first torsion mode but also the resonant frequencies in the second and third torsion modes need to be raised as high as possible, so that the resonant vibration in any one of the first to third torsion modes is less likely to occur in the magnetic head suspension.

SUMMARY OF THE INVENTION

The present invention has been made in view of the above conventional art, and it is an object thereof to provide a magnetic head suspension capable of preventing as much as possible a generation of resonant vibrations in the second torsion mode and the third torsion mode as well as a generation of resonant vibration in the first torsion mode.

In order to achieve the object, the present invention provides a magnetic head suspension including a supporting part that is swung in a seek direction parallel to the disk surface directly or indirectly by an actuator, a load bending part that is connected at a proximal end portion to a distal end portion of the supporting part so as to generate a load for pressing a magnetic head slider toward a disk surface, a load beam part that is connected at a proximal end portion to a distal end portion of the load bending part and transmits the load to the magnetic head slider, and a flexure part that is supported by the load beam part and the supporting part, wherein the load beam part includes a plate-like main body portion and paired right and left flange portions, the main body portion having a proximal end portion that is connected to the load bending part and a lower surface that faces the disk surface and to which a flexure substrate of the flexure part is fixed, the paired flange portions extending from both side edges of the main body portion in a suspension width direction toward a direction opposite from the disk surface, wherein each of the right and left side edges of the main body portion includes a proximal end region and a distal end region, the proximal end region being inclined to a suspension longitudinal center line at a first inclination angle so as to be come closer to the center line as it advances from the proximal side to the distal side in the suspension longitudinal direction, the distal end region being inclined to the center line at a second inclination angle, which is smaller than the first inclination angle, so as to come closer to the center line as it advances from the proximal side, which is connected to the distal portion of the proximal end region with an inflection point being interposed between them, to the distal side in the suspension longitudinal direction, wherein, in a case where a distance in the suspension longitudinal direction between the distal end portion of the supporting part and a dimple provided in the load beam part is represented by "L", a distance "a" in the suspension longitudinal direction between the distal end portion of the supporting part and the inflection point is set so as to satisfy a condition of $0.44L \leqq a \leqq 0.78L$, wherein the load beam part further includes a support plate that is fixed to the lower surface of the main body portion that faces the disk surface, wherein the support plate includes a proximal edge located at a position substantially identical with a position of the proximal edge of the main body portion, paired right and left side edges extending from both ends of the proximal edge toward the distal side in the suspension longitudinal direction, and a distal edge connecting distal ends of the paired side edges, and wherein each of the side edges of the support plate is located, with respect to the suspension width direction, inward from a virtual line that connects the proximal end of the proximal end region and the distal end of the distal end region and outward from the proximal end region and the distal end region, and extends, with respect to the suspension longitudinal direction, across the inflection point.

The thus configured magnetic head suspension according to the present invention makes it possible to raise the resonant frequencies in the second torsion mode and the third torsion mode as well as the resonant frequency of the first torsion mode, thereby effectively preventing resonant vibrations in the first to third torsion modes from being generated.

Accordingly, even if it is swung about a swing center at a higher speed so that the magnetic head slider is quickly positioned on the target track, the magnetic head slider can be effectively prevented from being displaced from the target track The load beam part is preferably provided at the proximal edge of the main body portion with a proximal flange portion that extends toward the direction opposite from the disk surface.

In one embodiment, the support plate includes a planar portion fixed to the lower surface of the main body portion, and a bent portion bent from a proximal edge of the planar portion so as to extend toward the direction opposite from the disk surface. In this case, the bent portion forms the proximal flange portion.

In another case, the proximal edge of the main body portion of the load beam part is bent toward the direction opposite from the disk surface to form the proximal flange portion.

In a preferable embodiment, the main body portion of the load beam part is provided with a convex portion that bulges toward the direction opposite from the disk surface.

Each of the magnetic head suspensions that are explained earlier may further include a damper fixed to the upper surface, which is opposite from the disk surface, of the main body portion of the load beam part.

In a preferable embodiment, the main body portion of the load beam part includes a thick region that is thickened toward the direction opposite from the disk surface.

In a preferable embodiment, the damper or the thick region is arranged so that a proximal end portion of the damper or the thick region is located at a position substantially identical with a position of the proximal edge of the main body portion, and a distance in the suspension longitudinal direction between a distal end portion of the damper or the thick region and the distal end portion of the supporting part is more than or equal to 0.6L and less than or equal to 0.75L.

In any one of the above-explained magnetic head suspensions, the flexure substrate may function as the support plate.

BRIEF DESCRIPTION OF THE DRAWINGS

FIG. 11A is a top view of a magnetic head suspension according to a third embodiment of the present invention, and FIG. 11B is a cross sectional view taken along line 11B-11B in FIG. 11A.

FIG. 12A is a top view of a magnetic head suspension according to a fourth embodiment of the present invention, and FIGS. 12B and 12C are cross sectional views taken along line 12B-12B and line 12C-12C in FIG. 12A, respectively.

FIG. 15 is a graph showing a result of the sixth analysis.

FIG. 17 is a graph showing a result of the seventh analysis.

FIG. 19A is a top view of a magnetic head suspension according to a fifth embodiment of the present invention, and FIGS. 19B and 19C are cross sectional views taken along line 19B-19B and line 19C-19C in FIG. 19A, respectively.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1:
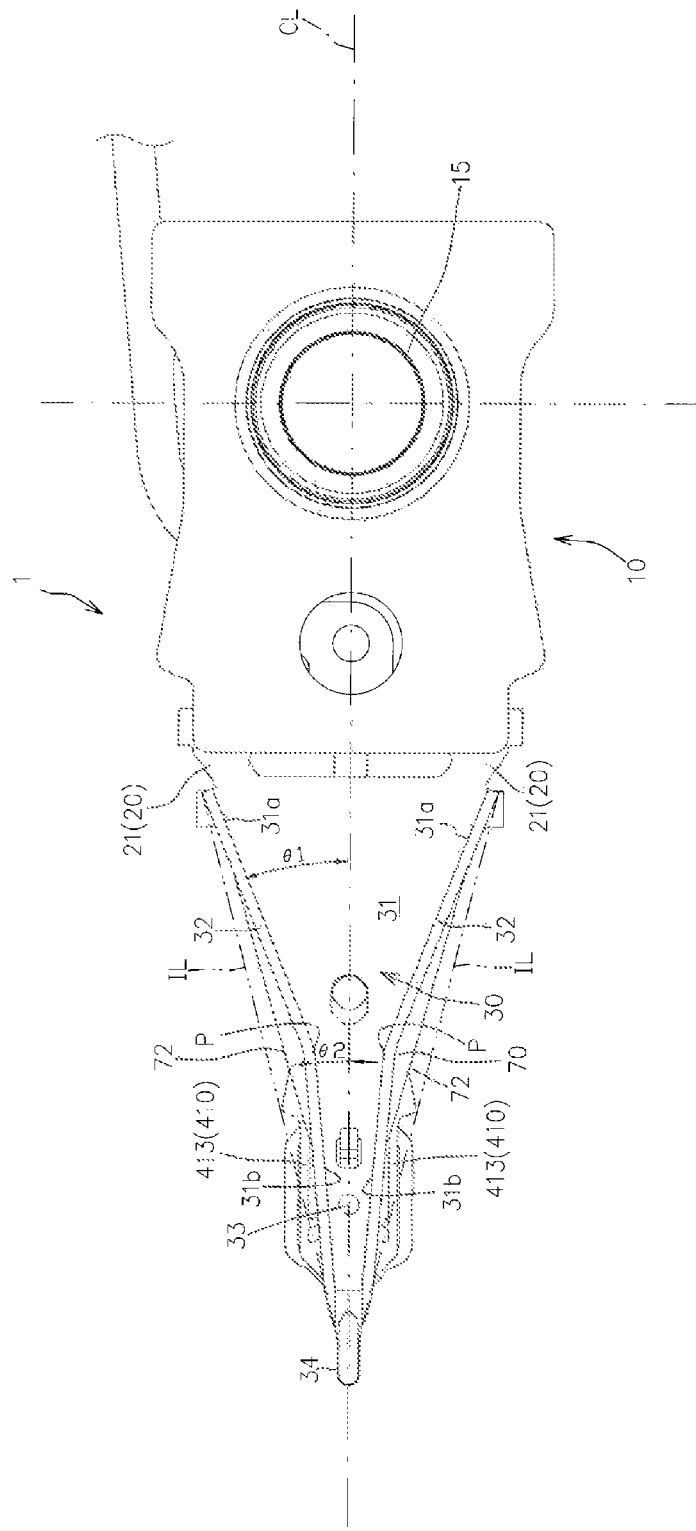
FIG. 1 is a top view of a magnetic head suspension according to a first embodiment of the present invention.

FIGS. 1 and 2A are a top view (a plan view as viewed from a side opposite from a disk surface) and a bottom view (a bottom plan view as viewed from a side close to the disk surface) of a magnetic head suspension 1 according to the present embodiment, respectively. FIG. 2A indicates welding points with small circles.

As shown in FIGS. 1 and 2A, the magnetic head suspension 1A includes a supporting part 10 that is swung in a seek direction parallel to the disk surface directly or indirectly by an actuator (no shown) such as a voice coil motor, a load bending part 20 that is connected at a proximal end portion to a distal end portion of the supporting part 10 so as to generate a load for pressing a magnetic head slider 50 toward a disk surface, a load beam part 30 that is connected at a proximal end portion to a distal end portion of the load bending part 20 and transmits the load to the magnetic head slider 50, and a flexure part 40 that is supported by the load beam part 30 and the supporting part 10.

The supporting part 10 is a member for supporting the load beam part 30 through the load bending part 20 while being directly or indirectly connected to the actuator, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

It is of course possible to adopt as the supporting part 10 an arm having a proximal end that is connected to the swing center of the main actuator.

As described above, the load beam part 30 is a member for transmitting the load generated by the load bending part 20 to the magnetic head slider 50, and therefore is required to have a predetermined rigidity.

As shown in FIG. 1, in the present embodiment, the load beam part 30 has a plate-like main body portion 31, and paired right and left flange portions 32 that extend from both side edges of the main body portion 31 in a suspension width direction toward a direction opposite from the disk surface, and secures the rigidity by the flange portions 32.

The load beam part 30 may be preferably made from, for example, a stainless plate having a thickness of 0.02 mm to 0.1 mm.

As shown in FIG. 1, each of the right and left side edges of the main body portion 31 includes a proximal end region 31a that is located on a proximal side in a suspension longitudinal direction, and a distal end region 31b that extends from the proximal end region 31a to a distal side in the suspension longitudinal direction.

The proximal end region 31a is inclined to a suspension longitudinal center line CL at a first inclination angle θ1 so as to be come closer to the center line CL as it advances from the proximal side to the distal side in the suspension longitudinal direction.

The distal end region 31b is inclined to the center line CL at a second inclination angle θ2, which is smaller than the first inclination angle θ1, so as to be come closer to the center line CL as it advances from the proximal side to the distal side in the suspension longitudinal direction.

More specifically, although both the proximal end region 31a and the distal end region 31b are inclined so as to be come closer to the center line CL as they advance to the distal end in the suspension longitudinal direction, the second inclination angle θ2 of the distal end region 31b is smaller than the first inclination angle θ1 of the proximal end region 31a so that there is a inflection point P between the corresponding proximal end region 31a and the distal end region 31b.

In a case where the inclination angles of the proximal end region 31a and the distal end region 31b are differed from each other so that the inflection point P is generated, the flange portion 32 is likely to be strained in the vicinity of the inflection point. In this regard, the inflection point O of the flange portion may be preferably formed so as to have a curved shape that is opened outward in the suspension width direction in a plan view, which results in reduction of strain of the flange portion 32.

The main body portion 31 is formed, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 415 of the flexure part 40, so that the load is transmitted to the head-mounting region 415 of the flexure part 40 through the protrusion 33.

In the present embodiment, as shown in FIGS. 1 and 2A, the load beam part 30 further includes a support plate 70 fixed to a lower surface of the main body portion 31 that faces the disk surface by welding or the like.

FIG. 2B is a bottom view of the support plate 70.

As shown in FIGS. 2A and 2B, the support plate 70 includes a proximal edge 71 located at a position substantially identical with a position of the proximal edge of the main body portion 31, paired right and left side edges 72 extending from both ends of the proximal edge 71 toward the distal side in the suspension longitudinal direction, and a distal edge 73 connecting distal ends of the paired side edges 72.

The side edges of the support plate 70 are each located inward from a corresponding virtual line IL that connects the proximal end of the corresponding proximal end region 31a and the distal end of the corresponding distal end region 31b, and are each located outward from the proximal end region 31a and the distal end region 31b, with respect to the suspension width direction. Each of the side edges of the support plate 70 extends across the corresponding inflection point P with respect to the suspension longitudinal direction.

More specifically, the support plate 70 has a distal edge 73 that is located closer to the distal end of the suspension in the longitudinal direction than the inflection points P. The support plate 70 also has side edges 72 each of which is located in a region having a substantially triangular shape in a planar view, to be defined by the corresponding virtual line IL, the proximal end region 31a, and the distal end region 31b. Further, each of the side edges 72 of the support plate 70 intersects with the corresponding distal end region 31b at a position close to the distal end and intersects with the corresponding proximal end region 31a at a position close to the proximal end in a planar view.

In the present embodiment, the load beam part 30 further integrally includes a lift tab 34 that extends from a distal end of the main body portion 31 toward the distal side in the suspension longitudinal direction. The lift tab 34 is a member that engages with a lamp provided in a magnetic disk device so as to cause the magnetic head slider 50 to move away from the disk surface in the z direction (a direction perpendicular to the disk surface) at the time when the magnetic head suspension 1 is swung by the main actuator so that the magnetic head slider 50 is positioned outward from the disk surface in a radial direction.

The load bending part 20 has a proximal end connected to the supporting part 10 and a distal end connected to the load beam part 30, and generates the load for pressing the magnetic head slider 50 toward the disk surface in accordance with its elastic deformation.

As shown in FIGS. 1 and 2A, in the present embodiment, the load bending part 20 includes paired right and left leaf springs 21 that have plate surfaces facing the disk surface and are disposed away from each other with the center line CL being sandwiched between them.

Preferably, the paired leaf springs 21 are elastically bended in such a direction as to cause the magnetic head slider 50 to be come close to the disk surface before the magnetic head suspension 1 is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1 and to 2A, the load bending part 20 is integrally formed with the main body portion and the flange portions of the load beam part 30.

More specifically, the magnetic head suspension 1 according to the present embodiment includes a load beam part/load bending part component that integrally forms the main body portion 31 and the flange portions 32 of the load beam part 30 as well as the load bending part 20. The load beam part/load bending part component is connected by welding to the supporting part 10 in a state where an upper surface of the load beam part/load bending part component that is opposite from the disk surface is brought into contact with a lower surface of the supporting part 10 that faces the disk surface.

Of course, it is possible that the load bending part 20 is made from a member separate from the main body portion 31 and the flange portions 32, and then the load bending part 20 is connected by welding or the like to the main body portion 31.

The flexure part 40 is fixed by welding or the like to the load beam part 30 and the supporting part 10 while supporting the magnetic head slider 50.

More specifically, the flexure part 40 includes a flexure metal plate 410.

As shown in FIG. 1B, the flexure metal plate 410 includes a supporting part fixed region 411 fixed by a welding or the like to the supporting part 10, a load beam part fixed region 412 fixed by a welding or the like to the load beam part 30, paired supporting pieces 413 extending toward the distal side in the suspension longitudinal direction from both sides, in the suspension width direction, of the distal portion of the load beam part fixed region 412, and the head-mounting region 415 supported by the supporting pieces 413.

As explained earlier, in the present embodiment, the load beam part 30 includes the support plate 70 fixed to the lower surface of the main body portion 31.

Therefore, the load beam fixed region 412 is fixed to the support plate 70.

The head-mounting region 415 supports the magnetic head slider 50 at its lower surface that faces the disk surface, as shown in FIG. 1B.

As explained earlier, the protrusion 33 is brought into contact with the upper surface of the head-mounting region 415, so that the head-mounting region 415 could sway flexibly in a roll direction and in a pitch direction, with the protrusion 33 functioning as a fulcrum.

The flexure metal plate 410 has rigidity lower than that of the load beam part 30, so that the head-mounting region 415 could sway in the roll direction and in the pitch direction.

The flexure metal plate 410 may be made from, for example, a stainless plate having a thickness of 0.01 mm to 0.025 mm.

Figure 2:
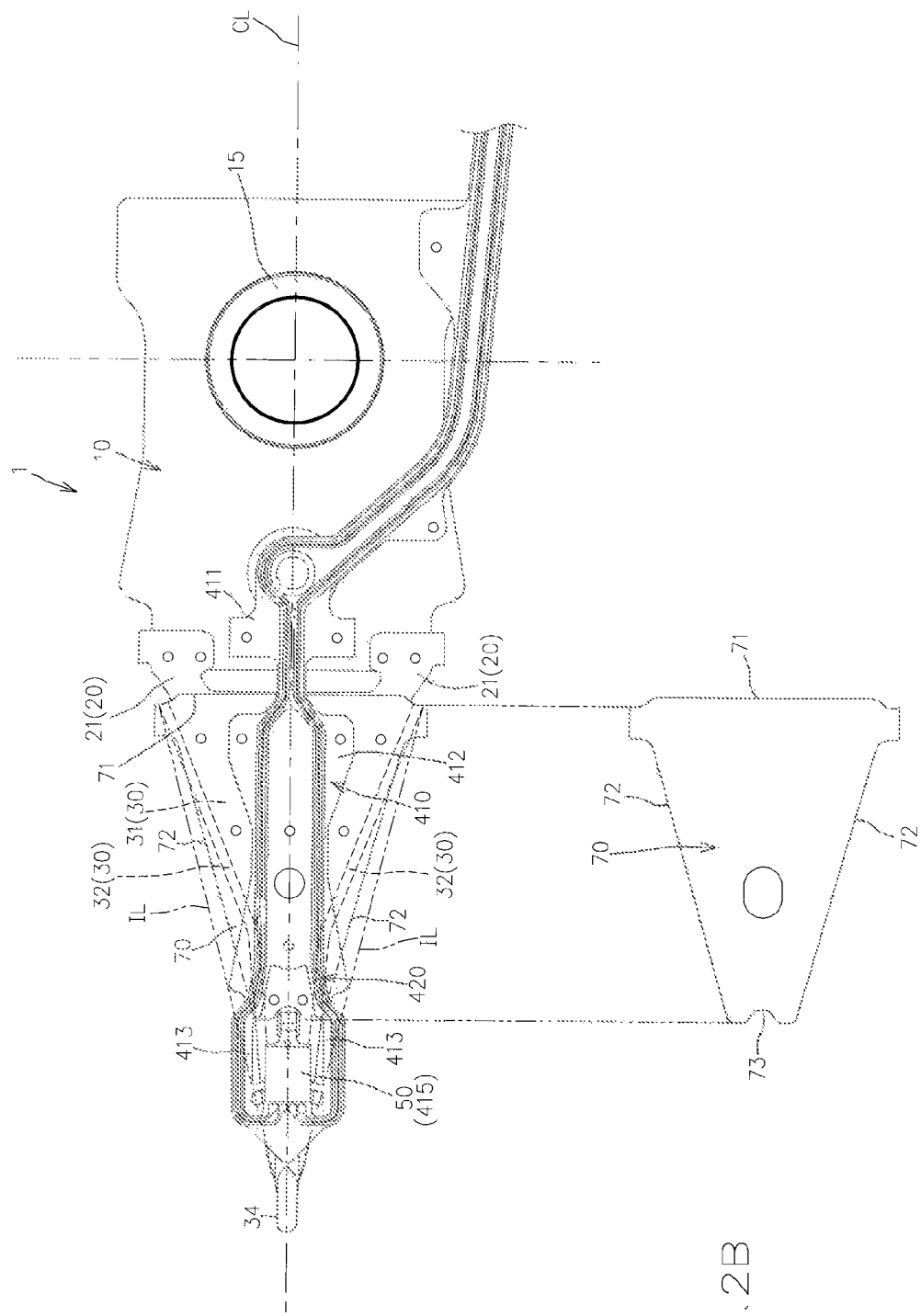
FIG. 2A is a bottom view of the magnetic head suspension according to the first embodiment.
FIG. 2B is a bottom view of a support plate of the magnetic head suspension.

In the present embodiment, as shown in FIG. 2, the flexure part 40 further integrally includes a wiring structure 420 for electrically connecting the magnetic head slider 50 to an outside member.

More specifically, the wiring structure 420 includes an insulating layer laminated on the lower surface of the flexure metal plate 410 that faces the disk surface, and a signal wiring laminated on a surface of the insulating layer that faces the disk surface.

Preferably, the signal wiring may include an insulative cover layer (not shown) enclosing the signal wiring.

Described below is a first analysis on the relationship between the positions of the inflection points P in the suspension longitudinal direction and the resonant frequency of the magnetic head suspension 1 in the first torsion mode.

Figure 3:
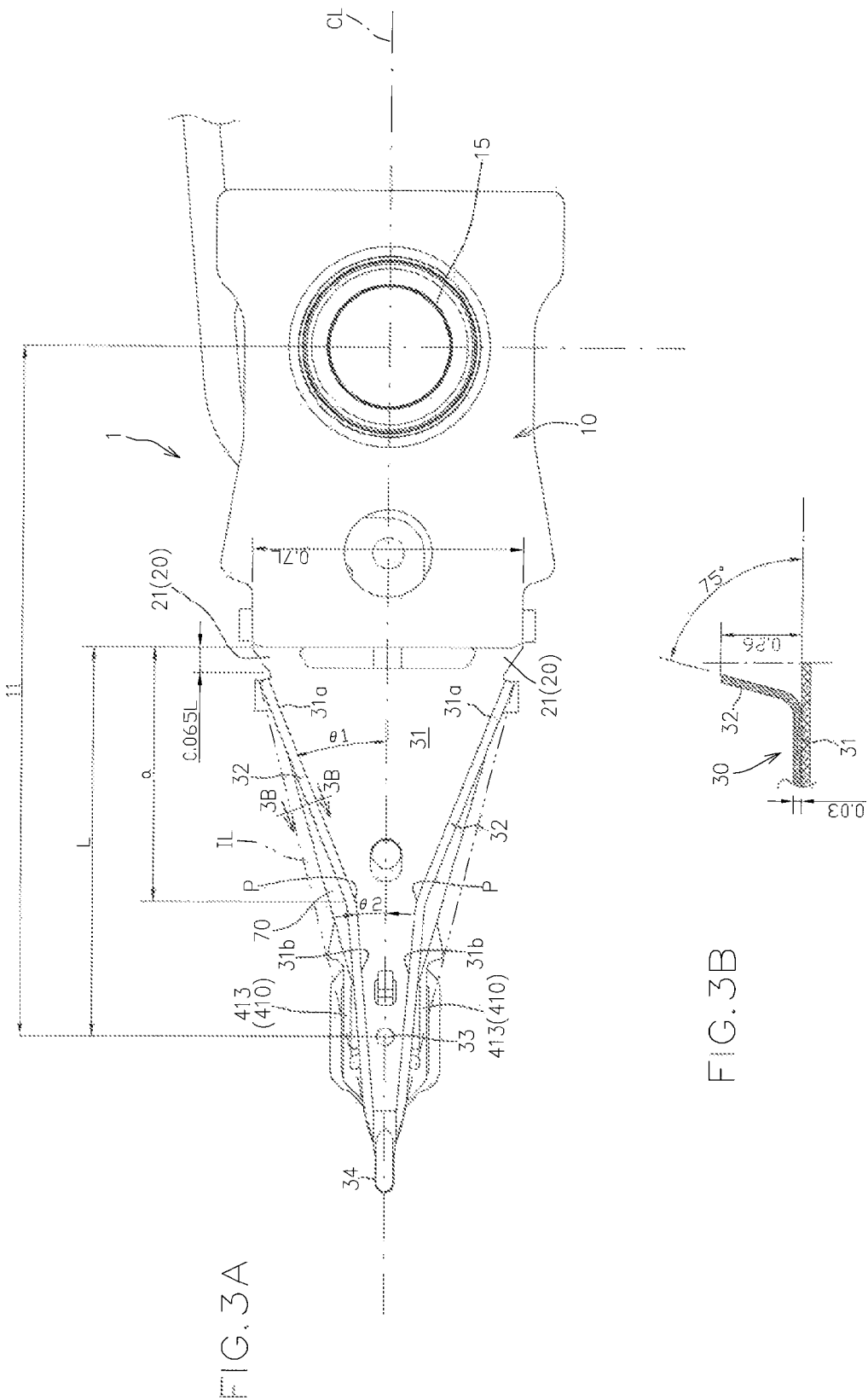
FIG. 3A is a top view of a magnetic head suspension used for first and second analyses.
FIG. 3B is a cross sectional view taken along line 3B-3B in FIG. 3A.
Figure 4:
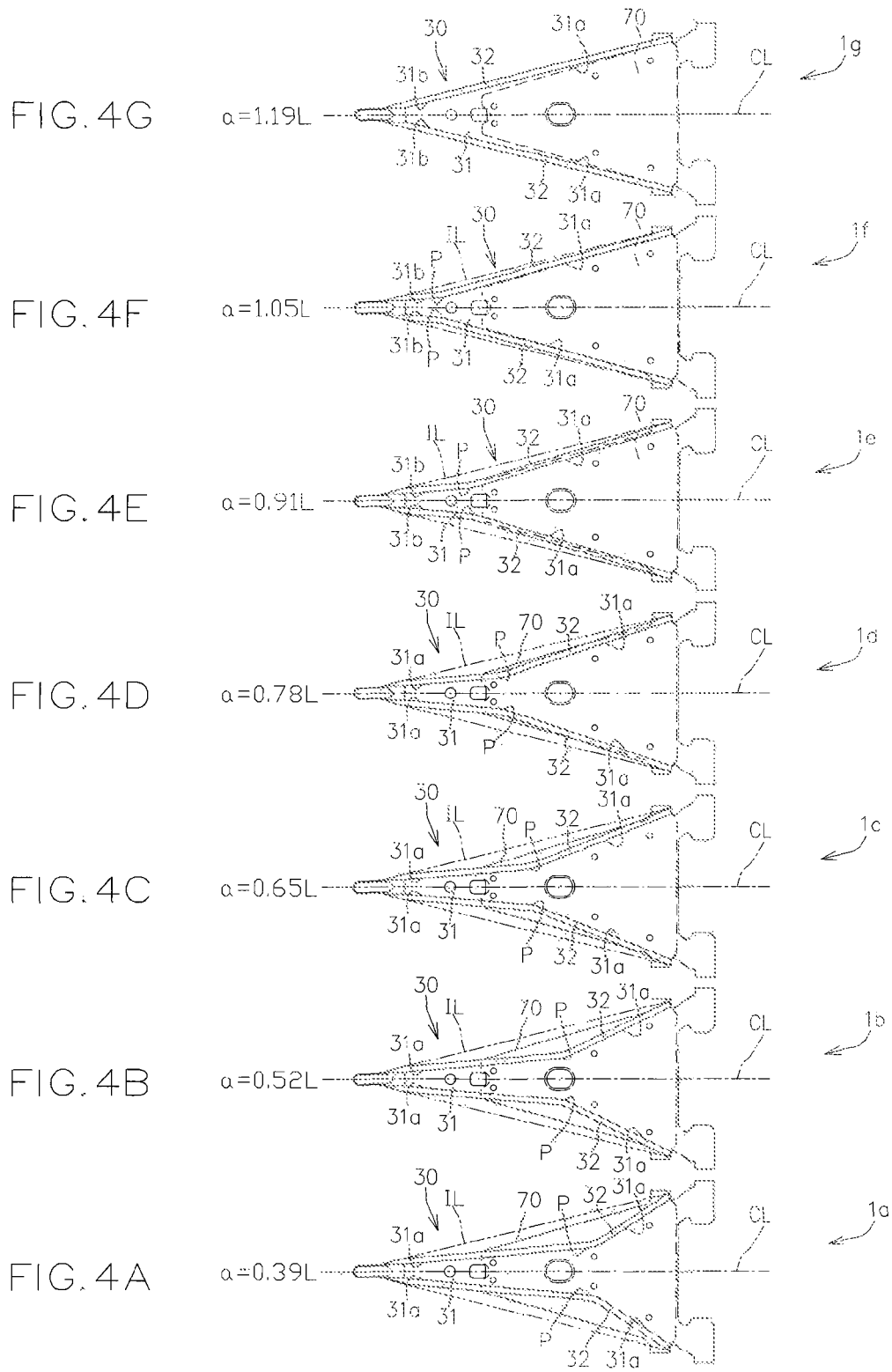
FIGS. 4A to 4G are top views of load beam parts of the magnetic head suspensions used for the first and second analyses.

FIG. 3A is a top view of the magnetic head suspension 1 used for the first analysis.

FIG. 3B is a cross sectional view taken along line 3B-3B in FIG. 3A.

In the first torsion mode, in a state where a position at which the load bending part 20 and a position at which the dimple 33 are arranged so as not to be displaced in the z direction perpendicular to the disk surface (namely, the positions form nodes), only the load beam part is principally twisted about the twist center line along the suspension longitudinal center line CL so that a substantially center portion between the two nodes in the suspension longitudinal direction is displaced to the maximum in the z direction (namely, the substantially center portion forms an antinode).

In the present analysis, the supporting part 10, the main body portion 31 of the load beam part 30, the support plate 70 and the flexure metal plate 410 were formed by stainless plates having thicknesses of 0.17 mm, 0.03 mm, 0.025 mm and 0.02 mm, respectively.

The length in the suspension longitudinal direction was set to 11 mm between the position of the dimple 33 and the position of the supporting part 10 that is fixed with respect to z direction perpendicular to the disk surface (in a case where the supporting part 10 is configured by a base plate as in the present embodiment, the position of the boss portion that is fixed by caulking to the carriage arm coupled to the actuator; hereinafter, referred to as a supporting part fixed position). A length "L" in the suspension longitudinal direction was set to 6.2 mm between the distal edge of the supporting part 10 and the dimple 33. The length of the load bending part 20 in the suspension longitudinal direction (that is, the length in the suspension longitudinal direction between the distal edge of the supporting part 10 and the proximal end of the load beam part 30) was set to 0.065L (=0.40 nm). Further, the length at the distal edge of the supporting part 10 in the suspension width direction was set to 0.7L (=4.3 mm).

Further, as shown in FIG. 3B, the flange portions 32 of the load beam part 30 were configured so that respective inclination angles to the main body portion 31 were 75° and respective heights in the z direction were 0.26 mm.

A plurality of magnetic head suspensions 1a to 1f were prepared by varying, in a state where the second inclination angle θ2 (the inclination angle of the distal end regions 31b to the suspension longitudinal center line CL) was fixedly set to 5° while having the above-mentioned configuration, the first inclination angle θ1 (the inclination angle of the proximal end regions 31a to the center line CL) in a range larger than the second inclination angle θ2 to differentiate the positions of the inflection points P in the suspension longitudinal direction between the proximal end regions 31a and the distal end regions 31b, respectively. The resonant frequency in the first torsion mode was obtained on each of the plurality of magnetic head suspensions 1a to 1f in accordance with the finite element method.

In addition, a magnetic head suspension 1g was prepared by setting the first inclination angle θ1 and the second inclination angle θ2 such that the first inclination angle θ1 of the proximal end regions 31a is identical with the second inclination angle θ2 of the distal end regions 31b (in other words, such that the right and left side edges of the main body portion 31 each have a linear shape in the entire area in the suspension longitudinal direction). The resonant frequency in the first torsion mode was also obtained on this magnetic head suspension 1g in accordance with the finite element method.

More specifically, in the magnetic head suspensions 1a to 1f, distances "a", each in the suspension longitudinal direction between the distal edge of the supporting part 10 and each of the inflection points P, were set to 0.39L (=2.45 mm), 0.52L (=3.25 mm), 0.65L (=4.05 mm), 0.78L (=4.85 mm), 0.91L (=5.65 mm) and 1.05L (=6.49 mm), respectively.

FIGS. 4A to 4G are top views of the respective load beam parts 60 of the magnetic head suspensions 1a to 1g.

Figure 5:
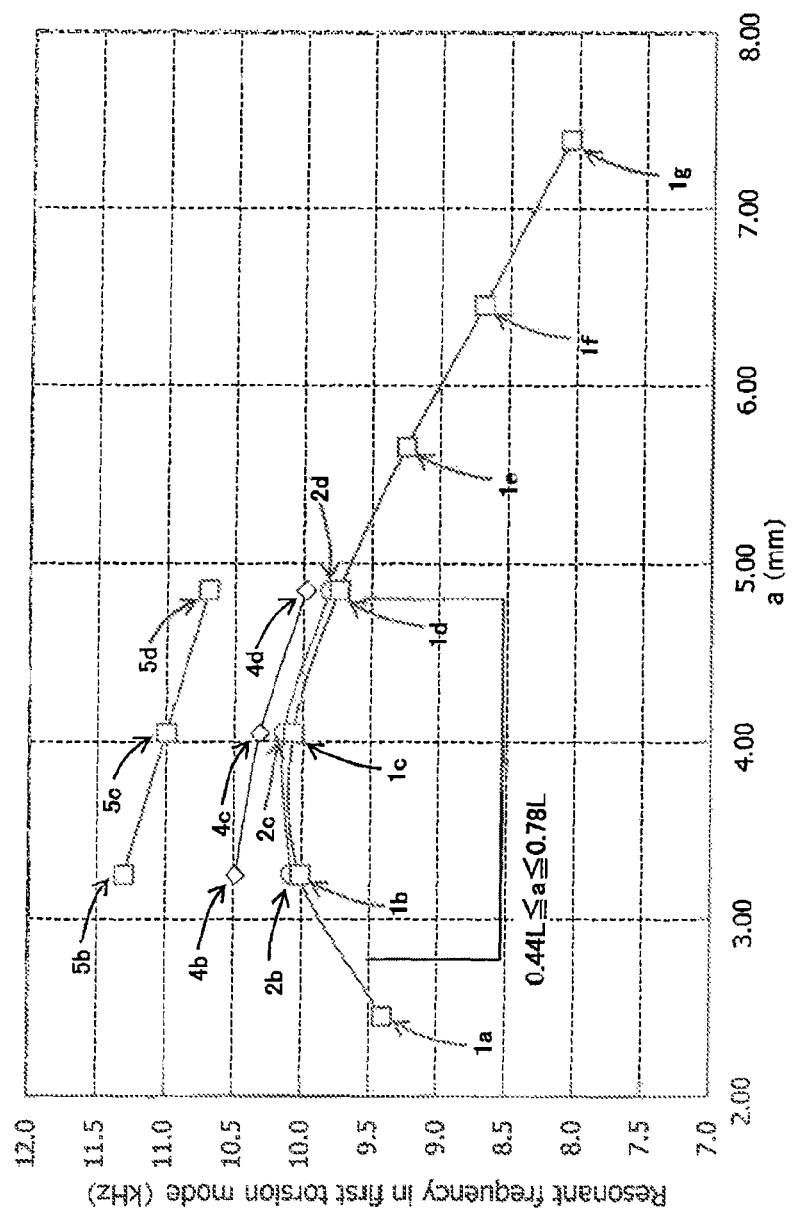
FIG. 5 is a graph showing a result of the first analysis.

FIG. 5 shows a result of the first analysis.

As can be recognized from FIG. 5, the resonant frequency in the first torsion mode can be raised by setting the distance "a" within a range from 0.44L (=2.7 mm) to 0.83L (=4.8 mm).

Described below is a second analysis on the resonant frequency in the SWAY mode of the magnetic head suspensions 1a to 1g.

Figure 6:
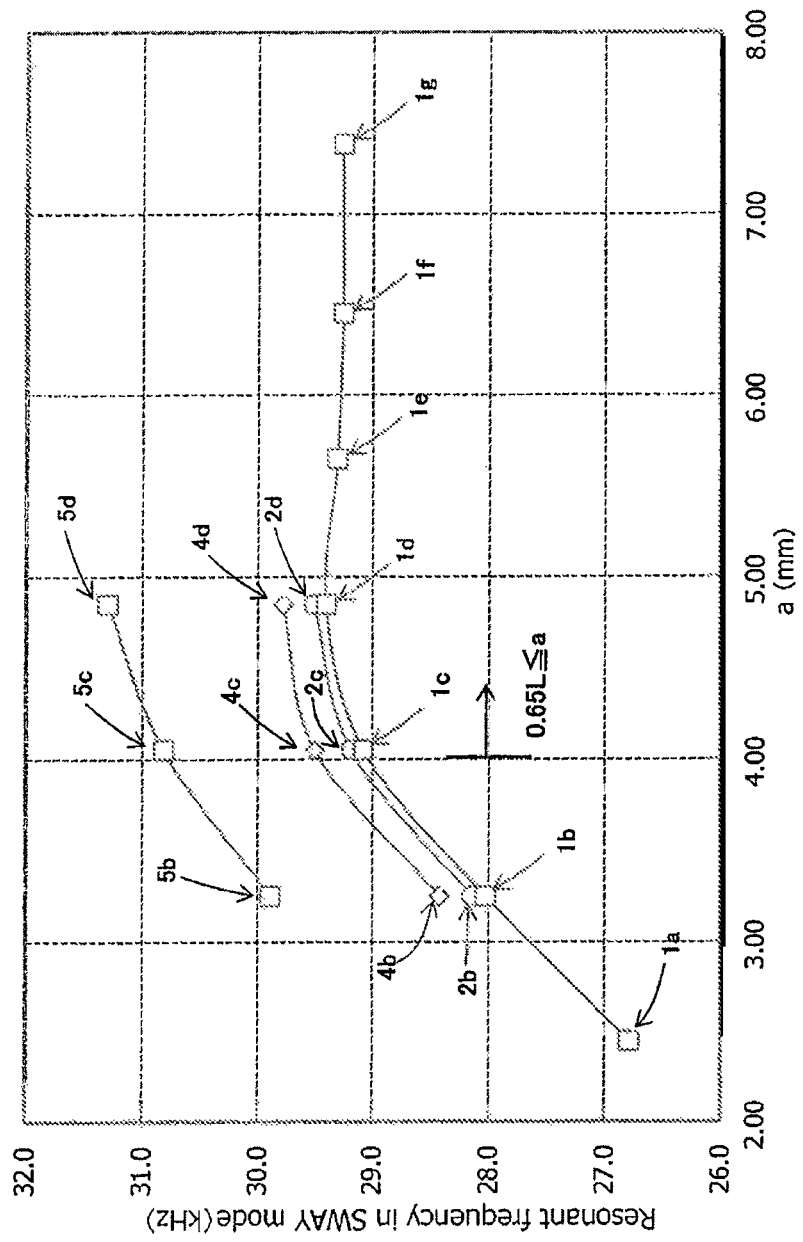
FIG. 6 is a graph showing a result of the second analysis.

FIG. 6 shows a result of the second analysis.

The SWAY mode is a main resonant mode of the magnetic head suspension that mainly includes a vibration in the seek direction.

As can be recognized from FIG. 6, the resonant frequency in the SWAY mode can be raised by making the distance "a" equal to or more than 0.65L (=4.0 mm).

Described below is a third analysis on the relationship between the shape of the support plate 70 and the resonant frequency in the second torsion mode.

In the second torsion mode, in a state where three positions form the nodes, the three positions including the supporting part fixed position, the position of the dimple 33 and a halfway position of the load beam part 30 that is located at a substantially center in the suspension longitudinal direction between the supporting part fixed position and the position of the dimple 33, a portion of the supporting part 10 that is positioned forward from the supporting part fixed position, the load tending part 20 and the load beam part 30 are twisted about the twist center line along the suspension longitudinal center line CL so that two portions form the antinode, the two portions including a substantially center portion between the supporting part fixed position and the halfway position of the load beam part 30 in the suspension longitudinal direction and a substantially center portion between the halfway position of the load beam part 30 and the position of the dimple 33 in the suspension longitudinal direction.

Figure 7A:
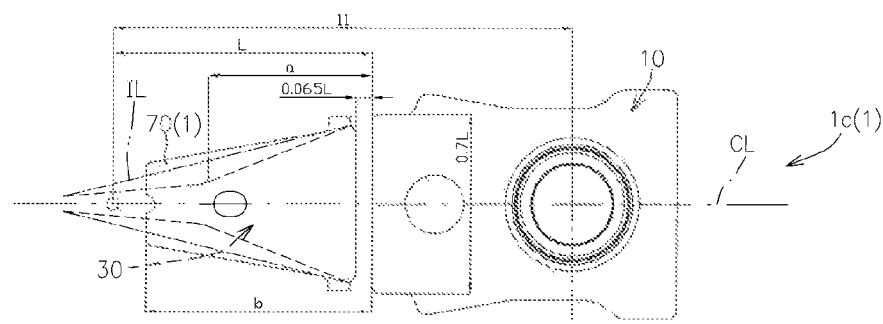
FIGS. 7A to 7C are schematic views of magnetic head suspensions used for third and fourth analyses.
Figure 7B:
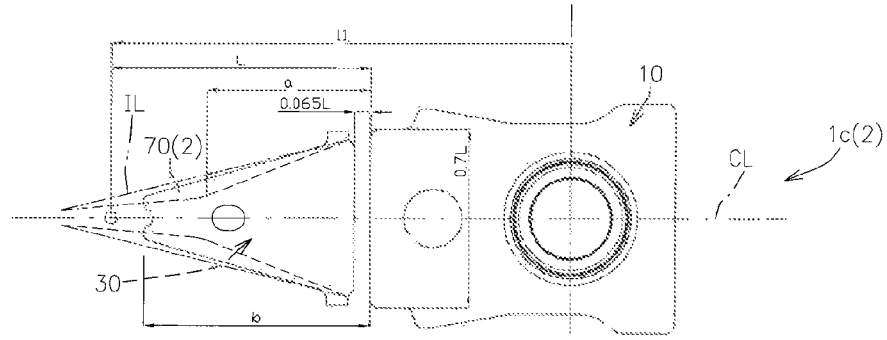
Figure 7C:
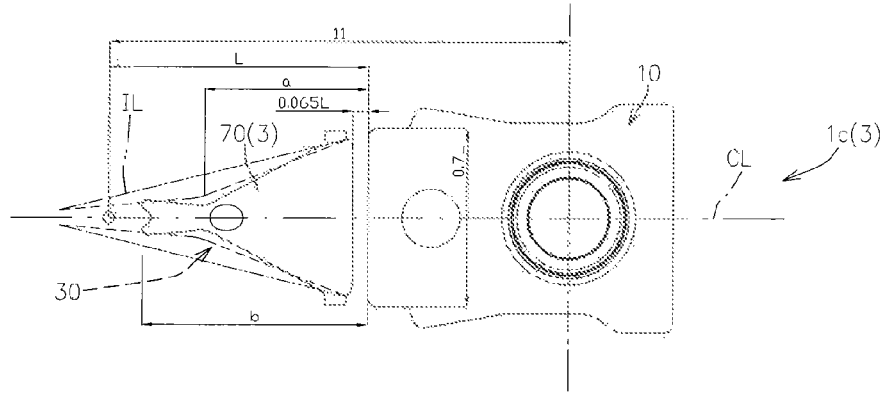

FIGS. 7A to 7C are schematic views of magnetic head suspensions 1c(1) to 1c(3) that are used for the third analysis.

In the present analysis, the supporting part 10, the main body portion 31 of the load beam part 30, the support plate 70 and the flexure metal plate 410 were formed by stainless plates having thicknesses of 0.17 mm, 0.03 mm, 0.025 mm and 0.02 mm, respectively.

As shown in FIGS. 7A to 7C, the length "L" in the suspension longitudinal direction was set to 6.2 mm between the distal edge of the supporting part 10 and the dimple 33. The length of the load bending part 20 in the suspension longitudinal direction was set to 0.065L (=0.40 mm). Further, the length at the distal edge of the supporting part 10 in the suspension width direction was set to 0.7L (=4.3 mm).

The flange portions 32 of the load beam part 30 were configured so that respective inclination angles to the main body portion 31 were 75° and respective heights in the z direction were 0.26 mm.

Furthermore, the distance "a" in the suspension longitudinal direction between the distal edge of the supporting part 10 and the inflection point P was set to 0.65L (=4.05 mm).

The resonant frequency in the second torsion mode was obtained in accordance with the finite element method on the magnetic head suspension 1c(1) (see FIG. 7A) having the above-mentioned configuration as well as including, as the support plate 70, a support plate 70(1) that was arranged so that a distance "b" in the suspension longitudinal direction between the distal edge of the support plate and the distal edge of the supporting part 10 was set to 0.87L (=5.4 mm) and the side edges of the support plate were located outward from the corresponding virtual line IL in the suspension width direction.

The resonant frequency in the second torsion mode was also obtained in accordance with the finite element method on the magnetic head suspension 1c(2) (see FIG. 7B) having the above-mentioned configuration as well as including, as the support plate 70, a support plate 70(2) that was arranged so that the distance "b" was set to 0.87L (=5.4 mm) and the side edges of the support plate were located inward from the corresponding virtual line IL in the suspension width direction and outward from the corresponding proximal end region 31a and the corresponding distal end region 31b in the suspension width direction.

Furthermore, the resonant frequency in the second torsion mode was obtained in accordance with the finite element method on the magnetic head suspension 1c(3) (see FIG. 7C) having the above-mentioned configuration as well as including, as the support plate 70, a support plate 70(3) that was arranged so that the distance "b" was set to 0.87L (=5.4 mm) and the side edges of the support plate were located inward from the corresponding proximal end region 31a and the corresponding distal end region 31b in the suspension width direction.

Figure 8:
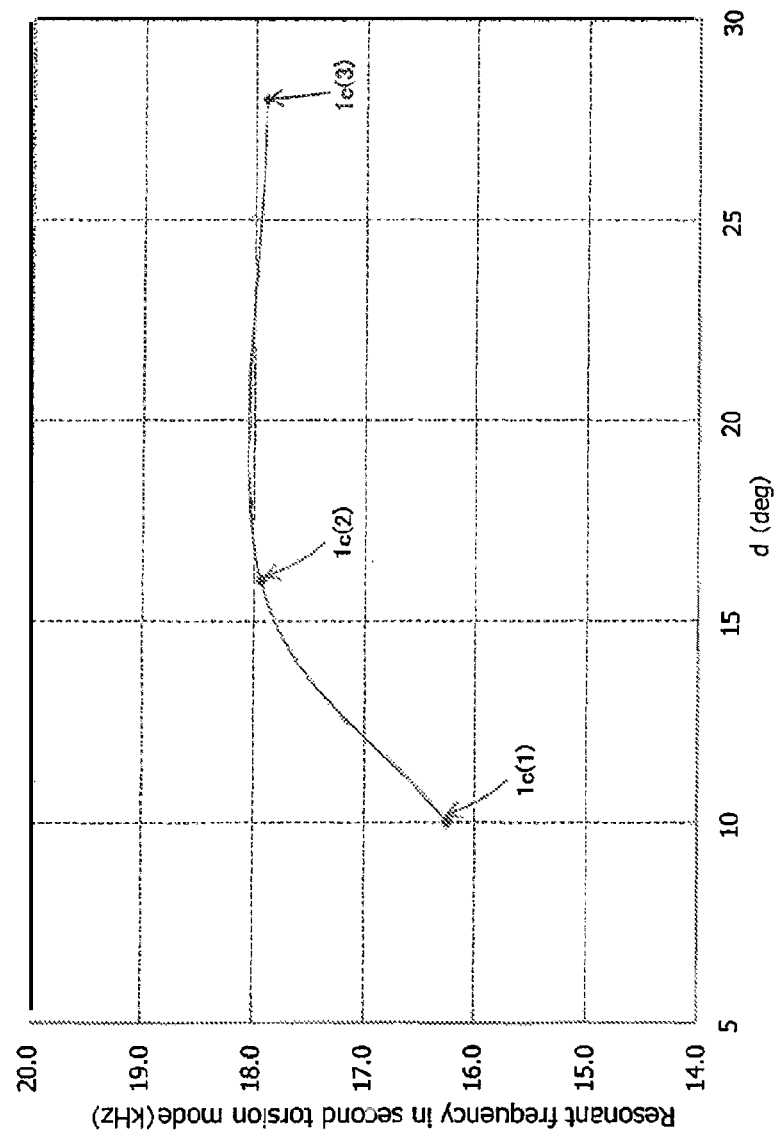
FIG. 8 is a graph showing a result of the third analysis.

FIG. 8 shows a result of the third analysis.

Furthermore, as a fourth analysis, the resonant frequency in the third torsion mode of each of the magnetic head suspensions 1c(1) to 1c(3) was obtained in accordance with the finite element method.

Figure 9:
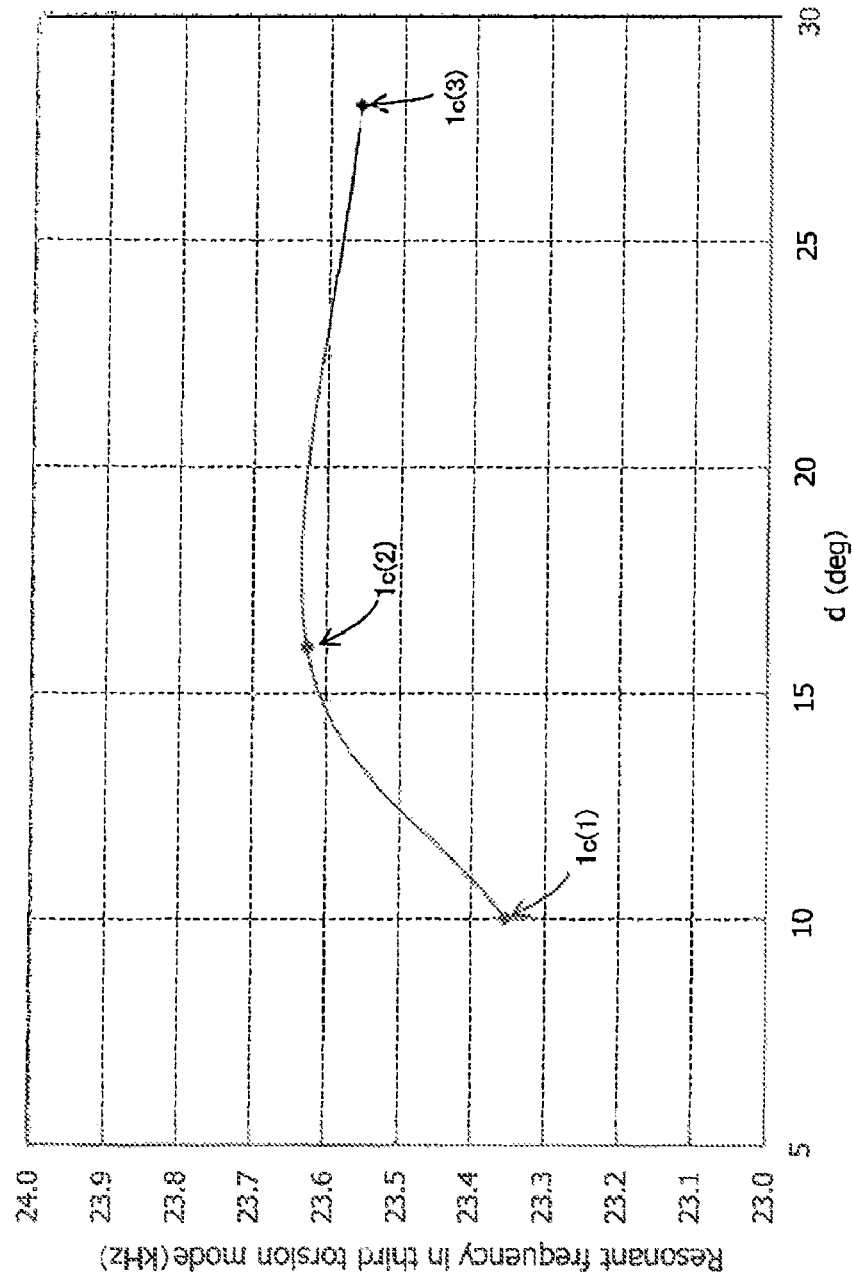
FIG. 9 is a graph showing a result of the fourth analysis.

FIG. 9 shows a result of the fourth analysis.

In the third torsion mode, in a state where four positions form the nodes, the four positions including the supporting part fixed position, the position of the load bending part 20, the position of the dimple 33 and the halfway position of the load beam part 30 that is located at a substantially center in the suspension longitudinal direction between the position of the load bending part 20 and the position of the dimple 33, a first portion located between the supporting part fixed position and the position of the load bending part 20 is twisted in a first direction about the twist center line along the suspension longitudinal center line CL, a second portion located between the position of the load bending part 20 and the halfway position of the load beam part 30 is twisted about the twist center line in a second direction, which is reverse to the first direction, and a third portion located between the halfway position of the load beam part 30 and the position of the dimple 33 is twisted about the twist center line in the first direction.

As can be recognized from FIGS. 8 and 9, the a magnetic head suspension 1c(2), which includes the support plate 70(2) having the side edges located inward from the virtual lines IL in the suspension width direction and outward from the proximal end regions 31a and the distal end regions 31b, can raise the resonant frequencies in the second torsion mode and in the third torsion mode, in comparison to the magnetic head suspension 1c(1) that includes the support plate 70(1) having the side edges located outward from the virtual lines IL in the suspension width direction, as well as in comparison to the magnetic head suspension 1c(3) that includes the support plate 70(3) having the side edges located inward from the proximal end regions 31a and the distal end regions 31b in the suspension width direction.

Second Embodiment

Hereinafter, another embodiment of the magnetic head suspension according to the present invention will be described, with reference to the attached drawings.

Figures 10A, 10B:
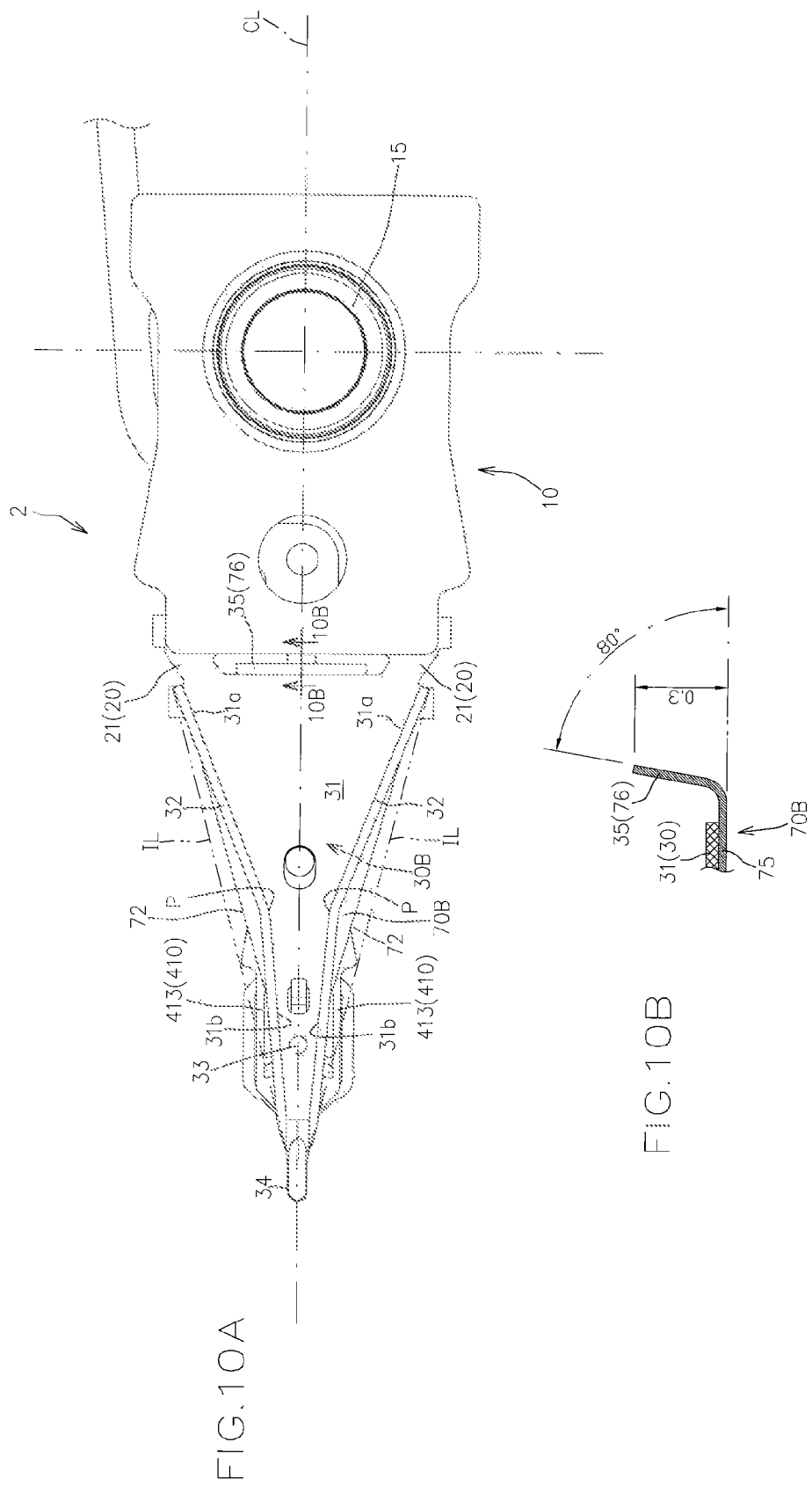
FIG. 10A is a top view of a magnetic head suspension according to a second embodiment of the present invention.
FIG. 10B is a cross sectional view taken along line 10B-10B in FIG. 10A.

FIG. 10A is a top view of a magnetic head suspension 2 according to the present embodiment.

FIG. 10B is a cross sectional view taken along line 10B-10B in FIG. 10A.

In the figures, the members same as those in the first embodiment are denoted by the same reference numerals to omit the detailed description thereof.

As shown in FIGS. 10A and 10B, the magnetic head suspension 2 according to the present embodiment is different from the magnetic head suspension 1 according to the first embodiment in that it includes a load beam part 30B in which the main body portion 31 is provided at the proximal edge with a proximal flange portion 35.

More specifically, the magnetic head suspension 2 according to the present embodiment includes the load beam part 30B in place of the load beam part 30 in comparison with the magnetic head suspension 1 according to the first embodiment.

The load beam part 30B includes a support plate 70B in place of the support plate 70 in comparison with the load beam part 30.

Specifically, the load beam part 30 includes the main body portion 31 and the paired flange portions 32, and also includes the support plate 70B fixed to the lower surface of the main body portion 31.

The support plate 70B includes a planar portion 75 fixed to the lower surface of the main body portion 31, and a bent portion 76 bent at a proximal edge of the planar portion 75 so as to extend toward the direction opposite from the disk surface to form the proximal flange portion 35 provided at the proximal edge of the main body portion 31 of the load beam part 30B between the paired leaf springs 21 in the suspension width direction.

The resonant frequencies in the first torsion mode and the SWAY mode were obtained in accordance with the finite element method on magnetic head suspensions 2b to 2d in which the distances "a", each in the suspension longitudinal direction between the distal edge of the supporting part 10 and each of the inflection points P, were set to 0.52L (=3.25 mm), 0.65L (=4.05 mm) and 0.78L (=4.85 mm), respectively in a state where the bent portion 76 of the support plate 70b had a length of 2.0 mm in the suspension width direction, an inclination angle of 80° with respect to the planar portion and a height of 0.3 mm in the z direction.

FIGS. 5 and 6 also show the result.

As is apparent from FIGS. 5 and 6, the provision of the proximal flange portion 35 at the proximal edge of the main body portion 31 can raise the resonant frequencies in the first torsion mode and the SWAY mode, thereby preventing resonant vibrations in the first torsion mode and the SWAY mode.

The present embodiment includes the support plate 70B with the planar portion 75 and the bent portion 76, wherein the bent portion 76 of the support plate 70B forms the proximal flange portion 35. Alternatively, it is also possible to bend the proximal edge of the main body portion 31 of the load beam part 30B toward the direction opposite from the disk surface to form the proximal flange portion 35.

Third Embodiment

Hereinafter, still another embodiment of the magnetic head suspension according to the present invention will be described, with reference to the attached drawings.

FIG. 11A is a top view of a magnetic head suspension 3 according to the present embodiment.

FIG. 11B is a cross sectional view taken along line 11B-11B in FIG. 11A.

In the figures, the members same as those in the first and second embodiments are denoted by the same reference numerals to omit the detailed description thereof.

As shown in FIGS. 11A and 11B, the magnetic head suspension 3 according to the present embodiment is different from the magnetic head suspension 1 according to the first embodiment in that a main body portion 31C of a load beam part 30C is provided on a proximal side with a convex portion (or bulging portion) 36.

More specifically, the magnetic head suspension 3 according to the present embodiment includes the load beam part 30C in place of the load beam part 30 in comparison with the magnetic head suspension 1 according to the first embodiment.

The load beam part 30C includes a main body portion 31c substantially parallel to the disk surface, and the paired flange portions 32 that extend from both side edges of the main body portion 31C in the suspension width direction toward the direction opposite from the disk surface.

The main body portion 31C includes the convex portion 36 on the proximal side.

The convex portion 36 bulges toward the direction opposite from the disk surface and extends in the suspension width direction.

The provision of the convex portion 36 can also raise the resonant frequencies in the first torsion mode and the SWAY mode, thereby preventing resonant vibrations in the first torsion mode and the SWAY mode.

Fourth Embodiment

Hereinafter, still another embodiment of the magnetic head suspension according to the present invention will be described, with reference to the attached drawings.

FIG. 12A is a top view of a magnetic head suspension 4 according to the present embodiment.

FIGS. 12B and 12C are cross sectional views taken along line 12B-12B and line 12C-12C in FIG. 12A, respectively.

In the figures, the members same as those in the first to third embodiments are denoted by the same reference numerals to omit the detailed description thereof.

As shown in FIGS. 12A to 12C, the magnetic head suspension 4 according to the present embodiment is different from the magnetic head suspension 1 according to the first embodiment in that it includes a damper 60 fixed to the upper surface, which is opposite from the disk surface, of the main body portion 31 of the load beam part 30.

The damper 60 may include a first layer 61 that is fixed to the upper surface of the main body portion 31 that is opposite from the disk surface and is made from a viscoelastic material, and a second layer 62 fixed to an upper surface of the first layer 61 that is opposite from the disk surface.

The first layer 61 may be preferably formed by, for example, acrylic polymer and silicon.

The second layer 62 may be preferably formed by, for example, metal material such as stainless and aluminum, or plastic material such as polyethylene terephthalate.

Forming the second layer 62 by using plastic material can improve impact resistance of the magnetic head suspension 4 thanks to reduction in mass, in comparison with a case of forming the second layer 62 by using metal material.

The resonant frequencies in the first torsion mode and in the SWAY mode were obtained on a plurality of magnetic head suspensions $4b$ to $4d$ in accordance with the finite element method. In each of the magnetic head suspensions $4b$ to $4d$, the damper 60 has the first layer 61 made of an acrylic polymer of 50 μm in thickness and the second layer 62 made of a stainless steel of 50 μm in thickness, and is sized to cover substantially the entire area in the upper surface of the main body portion 31 not facing the disk surface, from the proximal edge of the main body portion 31 to the distal end of the suspension in the longitudinal direction over a length of 0.40L (=2.45 mm). In the magnetic head suspensions $4b$ to $4d$, the distances "a", each in the suspension longitudinal direction between the distal edge of the supporting part 10 and each of the inflection points P, are set to 0.52L (=3.25 mm), 0.65L (=4.05 mm), and 0.78L (=4.85 mm), respectively.

FIGS. 5 and 6 also show the result.

As is apparent from FIGS. 5 and 6, the provision of the damper 60 on the upper surface of the main body portion 31 that is opposite from the disk surface can raise the resonant frequencies in the first torsion mode and the SWAY mode, thereby preventing resonant vibrations in the first torsion mode and the SWAY mode.

Described below are a fifth analysis on the relationship between a fixed position of the damper 60 and the resonant frequency in the first torsion mode and a sixth analysis on the relationship between the fixed position and the resonant frequency in the SWAY mode, for a magnetic head suspension in which the length in the suspension longitudinal direction between the supporting part fixed position and the position of the dimple 33 was set to 11 mm, the length "L" in the suspension longitudinal direction between the distal edge of the supporting part 10 and the dimple 33 was set to 6.2 mm, and the distances "a" in the suspension longitudinal direction between the distal edge of the supporting part 10 and the inflection point P was set to 0.65L (=4.05 mm).

Figure 13A:
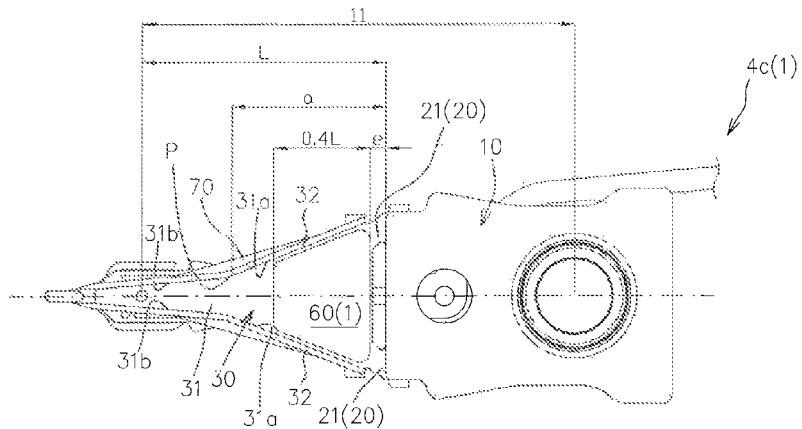
FIGS. 13A to 13C are top views of magnetic head suspensions used for fifth and sixth analyses, respectively.
Figure 13B:
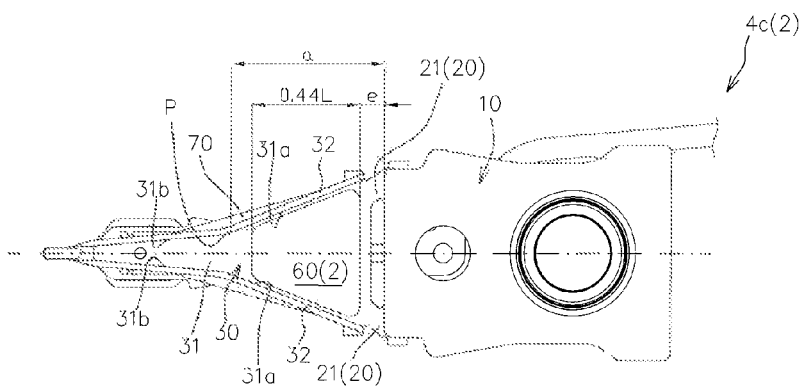
Figure 13C:
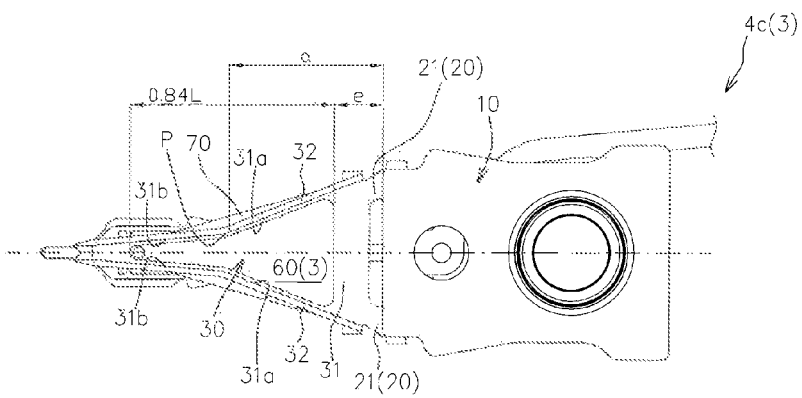

FIGS. 13A to 13C are top views of magnetic head suspensions $4c(1)$ to $4c(3)$ used for the fifth and sixth analyses.

In the fifth and sixth analyses, the damper 60 the first layer 61 made of an acrylic polymer of 50 μm in thickness and the second layer 62 made of a stainless steel of 50 μm in thickness.

The magnetic head suspension $4c(1)$ includes a damper 60(1) that covers substantially the entire region of the upper surface of the main body portion 31 that is opposite from the disk surface to extend from the proximal edge of the main body portion 31 until a position away from the proximal edge by 0.4L (=2.45 mm) toward the distal side in the suspension longitudinal direction, as the damper 60.

More specifically, the damper 60(1) of the magnetic head suspension $4c(1)$ has the proximal end portion arranged so that a distance "e" in the suspension longitudinal direction between the proximal end portion and the distal edge of the supporting part 10 is 0.065L (=0.4 mm).

The magnetic head suspension 4c(2) includes a damper 60(2) that is arranged forward from the damper 60(1) with respect to the suspension longitudinal direction and has an area (6.5 mm$^2$) identical with that of the damper 60(1).

More specifically, the damper 60(2) has a proximal end positioned such that a distance e is set to 0.1L (=0.62 mm) in the suspension longitudinal direction between the proximal end thereof and the distal edge of the supporting part 10. Further, the damper 60(2) has the length in the suspension longitudinal direction set to 0.44L (=2.75 mm) so as to have an area identical with that of the damper 60(1).

The magnetic head suspension 4c(3) includes a damper 60(3) that is arranged forward from the damper 60(2) with respect to the suspension longitudinal direction and has an area (6.5 mm$^2$) identical with those of the dampers 60(1), 60(2).

More specifically, the damper 60(3) has the proximal end portion arranged so that the distance "e" in the suspension longitudinal direction between the proximal end portion and the distal edge of the supporting part 10 is 0.02L (=1.24 mm), and also has a length in the suspension longitudinal direction of 0.84L (=5.18 mm) so as to have an area identical with those of the dampers 60(1), 60(2).

Figure 14:
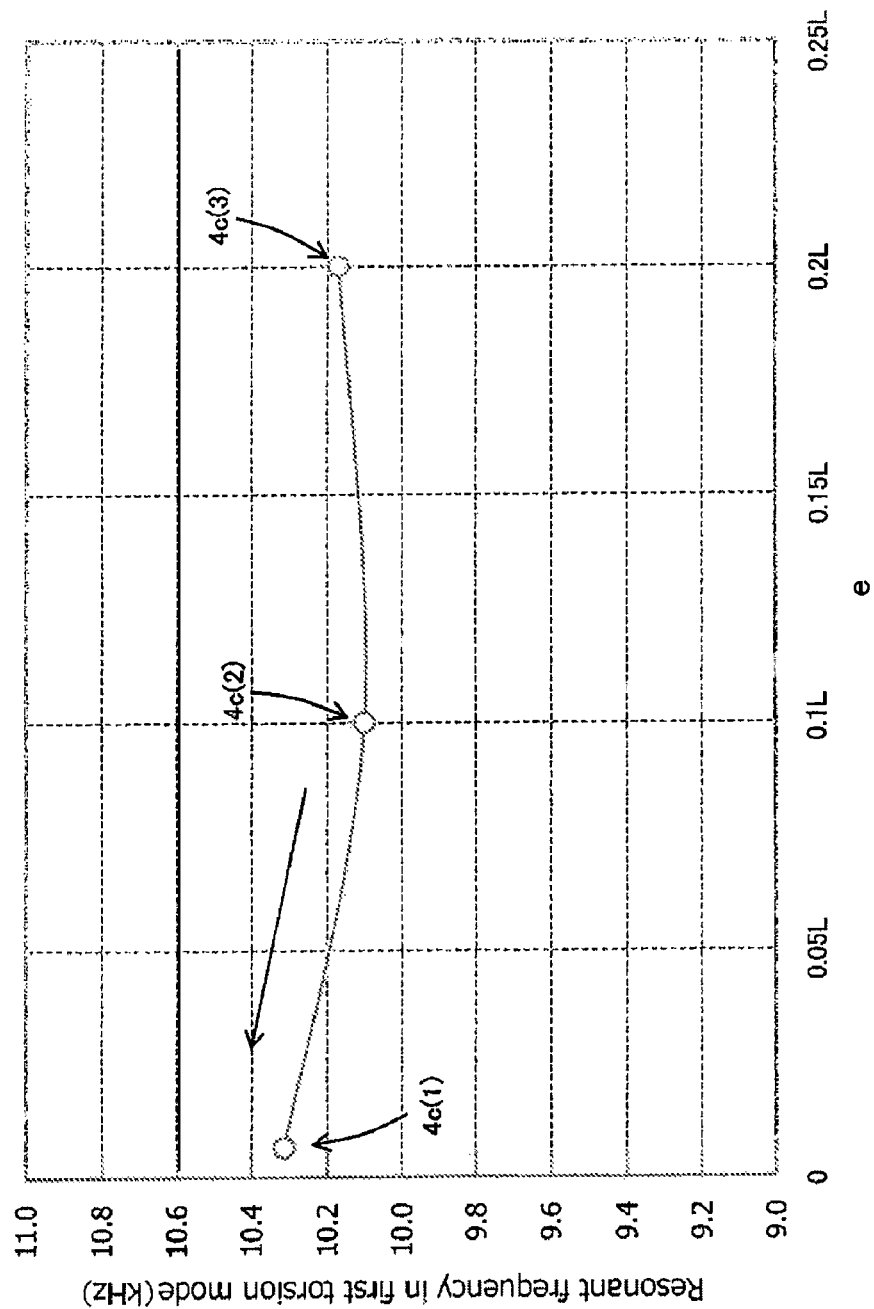
FIG. 14 is a graph showing a result of the fifth analysis.
Figure 16A:
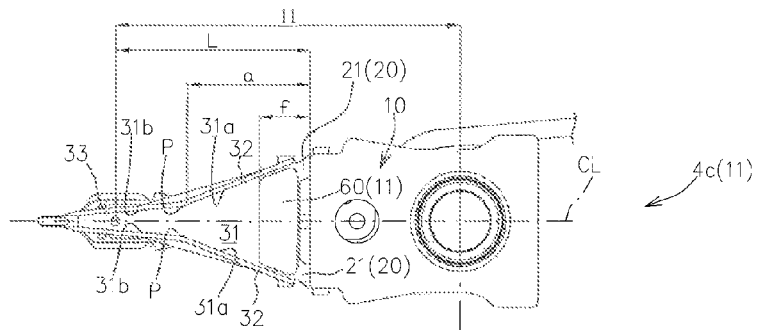
FIGS. 16A to 16E are top views of magnetic head suspensions used for seventh and eighth analyses.
Figure 16B:
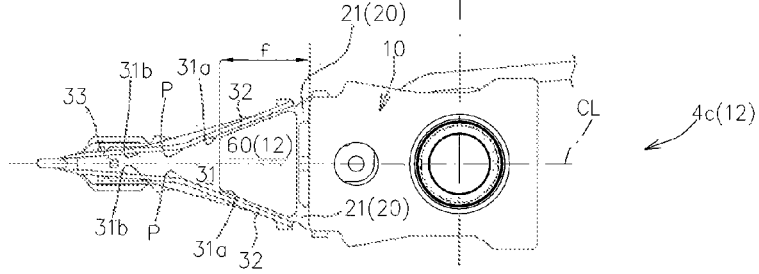
Figure 16C:
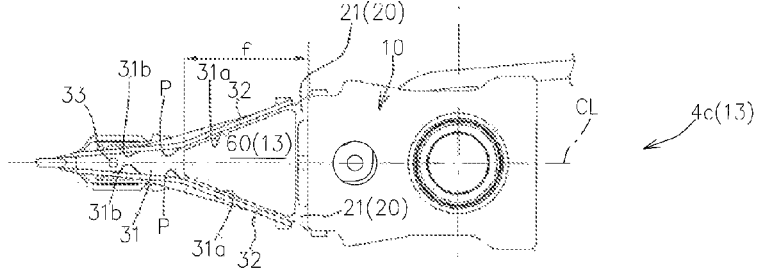
Figure 16D:
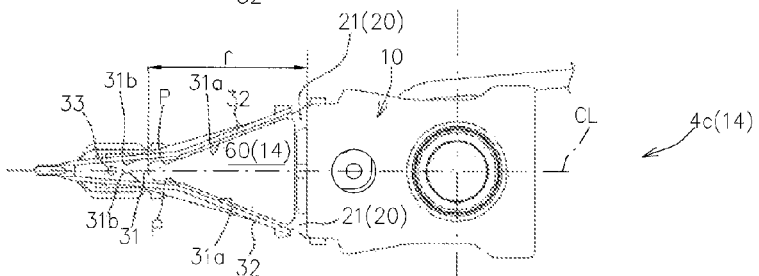
Figure 16E:
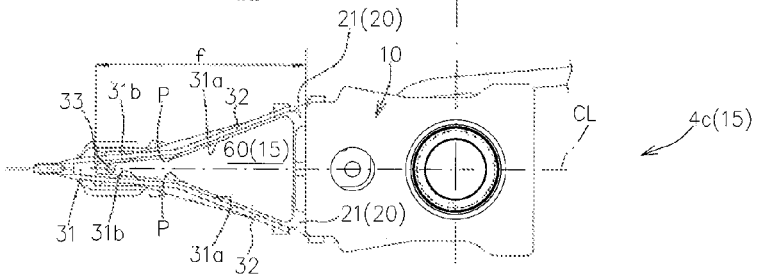

As a fifth analysis, the relationship between the fixed position of the damper 60 (namely, the distance "e") and the resonant frequency in the first torsion mode was obtained in accordance with the finite element method, on each of the magnetic head suspensions 4c(1) to 4c(3). FIG. 14 shows a result of the fifth analysis.

As a sixth analysis, the relationship between the fixed position of the damper 60 (namely, the distance "e") and the resonant frequency in the SWAY mode was obtained in accordance with the finite element method, on each of the magnetic head suspensions 4c(1) to 4c(3). FIG. 15 shows a result of the sixth analysis.

It is recognized from FIGS. 14 and 15 that, in cases of using the dampers 60 having identical areas, the resonant frequencies in the first torsion mode as well as in the SWAY mode can be raised by locating each of the dampers 60 as close as possible to the proximal end of the main body portion 31.

Described next are a seventh analysis conducted for obtaining the relationship between the length of the damper 60 in the suspension longitudinal direction and the resonant frequency in the first torsion mode, and an eighth analysis conducted for obtaining the relationship between the length and the resonant frequency in the SWAY mode.

The seventh and eighth analyses were conducted with use of magnetic head suspensions each having the distance "a" in the suspension longitudinal direction between the distal edge of the supporting part 10 and each of the inflection points P being set to 0.65L (=4.05 mm), and including the damper 60 that is fixed to the main body portion 31 so that the proximal end that is located at a position substantially identical with the position of the proximal edge of the main body portion 31. In these magnetic head suspensions, the lengths of the dampers 60 in the suspension longitudinal direction are variously differentiated.

FIGS. 16A to 16E are top views of magnetic head suspensions 4c(11) to 4c(15) that are used for the seventh and eighth analyses.

The magnetic head suspension 4c(11) includes a damper 60(11) configured so that a distance "f" in the suspension longitudinal direction between the distal edge of the supporting part 10 and the distal end of the damper is 0.26L (=1.62 mm).

The magnetic head suspension 4c(12) includes a damper 60(12) configured so that the distance "f" in the suspension longitudinal direction between the distal edge of the supporting part 10 and the distal end of the damper is 0.46L (=2.85 mm).

The magnetic head suspension 4c(13) includes a damper 60(13) configured so that the distance "f" in the suspension longitudinal direction between the distal edge of the supporting part 10 and the distal end of the damper is 0.64L (=3.95 mm).

The magnetic head suspension 4c(14) includes a damper 60(14) configured so that the distance "f" in the suspension longitudinal direction between the distal edge of the supporting part 10 and the distal end of the damper is 0.81L (=5.05 mm).

The magnetic head suspension 4c(15) includes a damper 60(15) configured so that the distance "f" in the suspension longitudinal direction between the distal edge of the supporting part 10 and the distal end of the damper is 1.08L (=6.70 mm).

As the seventh analysis, the resonant frequency in the first torsion mode was obtained on each of the magnetic head suspensions 4c(11) to 4c(15) in accordance with the finite element method. FIG. 17 shows a result of the seventh analysis.

Figure 18:
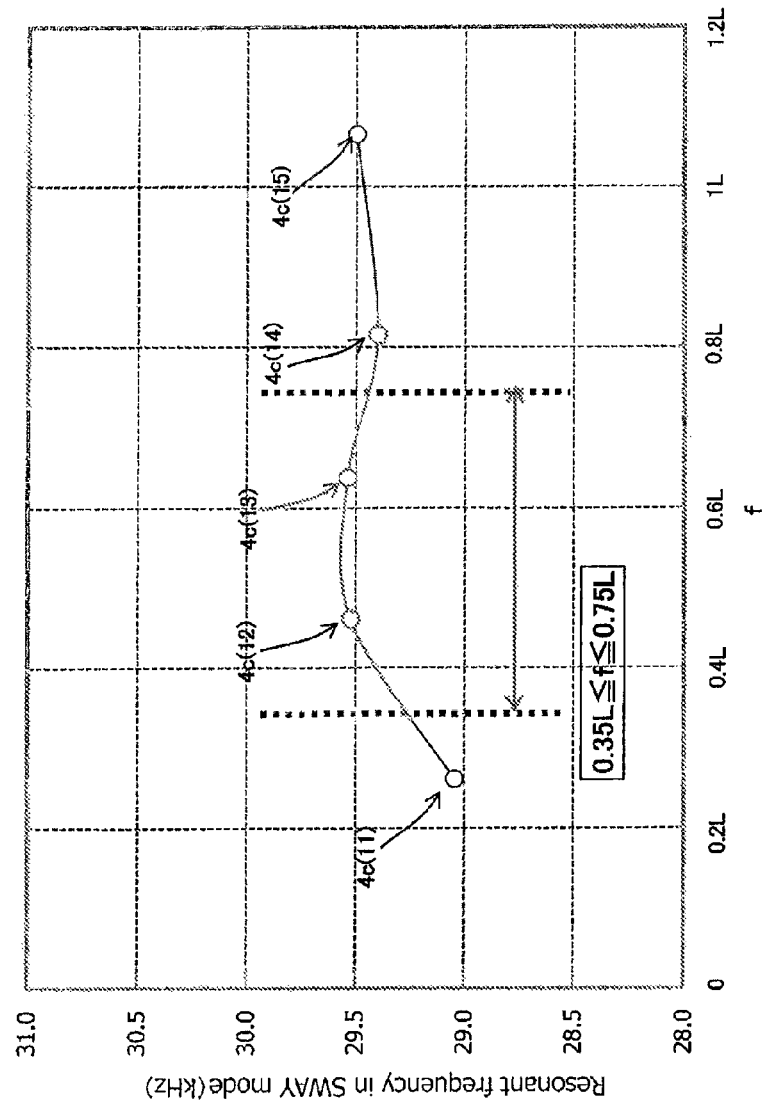
FIG. 18 is a graph showing a result of the eighth analysis.

As the eighth analysis, the resonant frequency in the SWAY mode was obtained on each of the magnetic head suspensions 4c(11) to 4c(15) in accordance with the finite element method. FIG. 18 shows a result of the eighth analysis.

As can be recognized from FIG. 17, the length f being set to 0.6L or more enables the resonant frequency in the first torsion mode to be substantially in a best condition, and the resonant frequency in the first torsion mode is not raised any more even if the length f is set to be larger than 0.6L.

Further, as can be recognized from FIG. 18, the length f satisfying the condition of $0.35L \leq f \leq 0.75L$ can raise the resonant frequency in the SWAY mode.

In accordance with the above analyses, the damper 60 is preferably located as close as possible to the proximal end of the main body portion 31 such that the proximal end of the damper 60 is located at a position substantially identical with the position of the proximal edge of the main body portion 31. Further, in order to raise the resonant frequencies both in the first torsion mode and in the SWAY mode, the length of the damper 60 is preferably set such that the length f in the suspension longitudinal direction between the distal end thereof and the distal edge of the supporting part 10 satisfies the condition of $0.6L \leq f \leq 0.75L$.

Fifth Embodiment

Hereinafter, still another embodiment of the magnetic head suspension according to the present invention will be described, with reference to the attached drawings.

FIG. 19A is a top view of a magnetic head suspension 5 according to the present embodiment.

FIGS. 19B and 19C are cross sectional views taken along line 19B-19B and line 19C-19C in FIG. 19A, respectively.

In the figures, the members same as those in the first to fourth embodiments are denoted by the same reference numerals to omit the detailed description thereof.

As shown in FIGS. 19A to 19C, the magnetic head suspension 5 according to the present embodiment is different from the magnetic head suspension 1 according to the first embodiment in that a load beam part 30E includes a main body portion 31E with a thick region 37.

More specifically, the magnetic head suspension 5 according to the present embodiment includes the load beam part 30E in place of the load beam part 30, in comparison with the magnetic head suspension 1 according to the first embodiment.

The load beam part 30E includes the plate-like main body portion 31E that has a plate surface substantially parallel to the disk surface in a state where its proximal end is connected to the load bending part 20, and the paired flange portions 32 that extend from both side edges of the main body portion 31E in the suspension width direction toward the direction opposite from the disk surface.

The load beam part 30E further includes the lift tab 34 as in each of the embodiments explained earlier.

As shown in FIGS. 19B and 19C, the thick region 37 is formed by causing a part of the upper surface of the main body portion 31E that is opposite from the disk surface to bulge in the direction opposite from the disk surface.

The load beam part 30E provided with the thick region 37 can be easily manufactured by a method including the steps of: preparing a load beam part formation plate having a thickness at least equal to that of the thick region 37; and etching the load beam part formation plate from the upper surface not facing the disk surface, by a corresponding etching amount such that the thick region 37 and the remaining region have predetermined thicknesses, respectively.

The resonant frequencies in the first torsion mode and in the SWAY mode were obtained in accordance with the finite element method on each of magnetic head suspensions 5b to 5d configured as detailed below. Specifically, in each of these magnetic head suspensions 5b to 5d, the position of the thick region 37 in the suspension longitudinal direction is set such that the proximal end of the thick region 37 is located at a position substantially identical with that of the proximal end of the main body portion 31E and the distal end thereof is spaced apart in the suspension longitudinal direction from the distal edge of the supporting part 10 by 0.46L (=2.85 mm). The main body portion 31E is 0.03 mm in thickness in the area except the thick region 37, and the thick region 37 is 0.08 mm in thickness. In the magnetic head suspensions 5b to 5d, the distances a, each between the distal edge of the supporting part 10 and each of the inflection points P in the suspension longitudinal direction, were set to 0.52L (=3.25 mm), 0.65L (=4.05 mm), and 0.78L (=4.85 mm), respectively.

The results are also shown in FIGS. 5 and 6.

As being apparent from FIGS. 5 and 6, the provision of the thick region 37 at the main body portion 31E can raise the resonant frequencies in the first torsion mode and the SWAY mode, thereby preventing resonant vibrations in the first torsion mode and the SWAY mode.

Judging from the commonality between the thick region 37 and the damper 60, both of which are provided as reinforcing structures, the thick region 37 is preferably formed such that the proximal end thereof is located at a position substantially identical with that of the proximal edge of the main body portion 31E. Further, the thick region 37 is preferably formed such that the distance in the suspension longitudinal direction between the distal end thereof and the distal edge of the supporting part 10 is from 0.6L to 0.75L.

In each of the embodiments, there is provided the support plate 70 that is separate from the flexure substrate. Alternatively, the flexure substrate can be configured so as to function as the support plate. The alternative configuration can improve impact resistance thanks to reduction in mass.

What is claimed is:

1. A magnetic head suspension comprising a supporting part that is swung in a seek direction parallel to the disk surface directly or indirectly by an actuator, a load bending part that is connected at a proximal end portion to a distal end portion of the supporting part so as to generate a load for pressing a magnetic head slider toward a disk surface, a load beam part that is connected at a proximal end portion to a distal end portion of the load bending part and transmits the load to the magnetic head slider, and a flexure part that is supported by the load beam part and the supporting part, wherein the load beam part includes a plate-like main body portion and paired right and left flange portions, the main body portion having a proximal end portion that is connected to the load bending part and a lower surface that faces the disk surface and to which a flexure substrate of the flexure part is fixed, the paired flange portions extending from both side edges of the main body portion in a suspension width direction toward a direction opposite from the disk surface, wherein each of the right and left side edges of the main body portion includes a proximal end region and a distal end region, the proximal end region being inclined to a suspension longitudinal center line at a first inclination angle so as to be come closer to the center line as it advances from the proximal side to the distal side in the suspension longitudinal direction, the distal end region being inclined to the center line at a second inclination angle, which is smaller than the first inclination angle, so as to be come closer to the center line as it advances from the proximal side, which is connected to the distal portion of the proximal end region with an inflection point being interposed between them, to the distal side in the suspension longitudinal direction, wherein, in a case where a distance in the suspension longitudinal direction between the distal end portion of the supporting part and a dimple provided in the load beam part is represented by "L", a distance "a" in the suspension longitudinal direction between the distal end portion of the supporting part and the inflection point is set so as to satisfy a condition of $0.44L \leq a \leq 0.78L$, wherein the load beam part further includes a support plate that is fixed to the lower surface of the main body portion that faces the disk surface, wherein the support plate includes a proximal edge located at a position substantially identical with a position of the proximal edge of the main body portion, paired right and left side edges extending from both ends of the proximal edge toward the distal side in the suspension longitudinal direction, and a distal edge connecting distal ends of the paired side edges, and wherein each of the side edges of the support plate is located, with respect to the suspension width direction, inward from a virtual line that connects the proximal end of the proximal end region and the distal end of the distal end region and outward from the proximal end region and the distal end region, and extends, with respect to the suspension longitudinal direction, across the inflection point.

2. A magnetic head suspension according to claim 1, wherein the load beam part is provided at the proximal edge of the main body portion with a proximal flange portion that extends toward the direction opposite from the disk surface.

3. A magnetic head suspension according to claim 2, wherein the support plate includes a planar portion fixed to the lower surface of the main body portion, and a bent portion bent from a proximal edge of the planar portion so as to extend toward the direction opposite from the disk surface, and wherein the bent portion forms the proximal flange portion.

4. A magnetic head suspension according to claim 2, wherein the proximal edge of the main body portion of the load beam part is bent toward the direction opposite from the disk surface to form the proximal flange portion.

5. A magnetic head suspension according to claim 1, wherein the main body portion of the load beam part is provided with a convex portion that bulges toward the direction opposite from the disk surface.

6. A magnetic head suspension according to claim 1, further comprising a damper fixed to the upper surface, which is opposite from the disk surface, of the main body portion of the load beam part.

7. A magnetic head suspension according to claim 6, wherein the damper is arranged so that a proximal end portion of the damper is located at a position substantially identical with a position of the proximal edge of the main body portion, and a distance in the suspension longitudinal direction between a distal end portion of the damper and the distal end portion of the supporting part is more than or equal to 0.6L and less than or equal to 0.75L.

8. A magnetic head suspension according to claim 1, wherein the main body portion of the load beam part includes a thick region that is thickened toward the direction opposite from the disk surface.

9. A magnetic head suspension according to claim 8, wherein the thick region is arranged so that a proximal end portion of the thick region is located at a position substantially identical with a position of the proximal edge of the main body portion, and a distance in the suspension longitudinal direction between a distal end portion of the thick region and the distal end portion of the supporting part is more than or equal to 0.6L and less than or equal to 0.75L.

10. A magnetic head suspension according to claim 1, wherein the flexure substrate functions as the support plate.

* * * * *